(12) United States Patent
Sun et al.

(10) Patent No.: US 12,438,970 B2
(45) Date of Patent: Oct. 7, 2025

(54) ROTATING MECHANISM, SUPPORTING APPARATUS, AND ELECTRONIC DEVICE

(71) Applicant: HONOR DEVICE CO., LTD., Shenzhen (CN)

(72) Inventors: Jian Sun, Shenzhen (CN); Yaolei Zhang, Shenzhen (CN); Haifei Li, Shenzhen (CN); Yuan Wang, Shenzhen (CN); Guotong Zhou, Shenzhen (CN); Leibo Yuan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 132 days.

(21) Appl. No.: 17/921,665

(22) PCT Filed: Apr. 26, 2022

(86) PCT No.: PCT/CN2022/089416
§ 371 (c)(1),
(2) Date: Oct. 27, 2022

(87) PCT Pub. No.: WO2022/247566
PCT Pub. Date: Dec. 1, 2022

(65) Prior Publication Data
US 2024/0259487 A1   Aug. 1, 2024

(30) Foreign Application Priority Data

May 27, 2021 (CN) .......................... 202110587683.5
Jul. 6, 2021 (CN) .......................... 202110763979.8

(51) Int. Cl.
*H04M 1/02* (2006.01)

(52) U.S. Cl.
CPC ......... *H04M 1/0268* (2013.01); *H04M 1/022* (2013.01)

(58) Field of Classification Search
CPC .. H04M 1/0268; H04M 1/022; H04M 1/0216; G06F 1/1616; G06F 1/1652; G06F 1/1681
(Continued)

(56) References Cited

U.S. PATENT DOCUMENTS

2018/0343330 A1   11/2018  Lin et al.
2019/0025887 A1*   1/2019  Seo ....................... G06F 1/1652
(Continued)

FOREIGN PATENT DOCUMENTS

CN   110570769 A   12/2019
CN   111968513 A   11/2020
(Continued)

*Primary Examiner* — Michael Y Mapa
(74) *Attorney, Agent, or Firm* — Fish & Richardson P.C.

(57) ABSTRACT

A rotating mechanism, a supporting apparatus, and an electronic device are provided. The rotating mechanism includes a base, a first connecting piece, a second connecting piece, a lifting plate, a force applying structure, and a supporting structure. The first connecting piece and the second connecting piece are both rotatably connected to the base; and when the first connecting piece and the second connecting piece are in an unfolding position, the force applying structure applies, to the lifting plate, a tensile force from the lifting plate to a side of the lifting plate away from a fitting surface, and the supporting structure applies, to the lifting plate, a first supporting force that counterbalances the tensile force.

18 Claims, 20 Drawing Sheets

(58) Field of Classification Search
USPC .................................... 455/566–575.1, 575.3
See application file for complete search history.

(56) References Cited

U.S. PATENT DOCUMENTS

2021/0096596 A1* 4/2021 Cheng .................. G06F 1/1616
2022/0400564 A1* 12/2022 Zhang ................. H05K 5/0226

FOREIGN PATENT DOCUMENTS

| CN | 112269426 A | 1/2021 |
| CN | 213069648 U | 4/2021 |
| CN | 113905113 A | 1/2022 |
| CN | 113923281 A | 1/2022 |

\* cited by examiner

ROTATING MECHANISM, SUPPORTING APPARATUS, AND ELECTRONIC DEVICE

CROSS-REFERENCE TO RELATED APPLICATIONS

This application is a national stage of International Application No. PCT/CN2022/089416, filed on Apr. 26, 2022, which claims priority to Chinese Patent Application No. 202110587683.5, filed on May 27, 2021 and Chinese Patent Application No. 202110763979.8, filed on Jul. 6, 2021. All of the aforementioned applications are hereby incorporated by reference in their entireties.

TECHNICAL FIELD

This application relates to the field of electronic device technologies, and in particular, to a rotating mechanism, a supporting apparatus, and an electronic device.

BACKGROUND

With the development of a flexible display technology, electronic devices with flexible displays have become hot technologies. Current folding methods include inward folding and outward folding, which means the display is on an inner side or an outer side after being folded. A problem in outward folding is that the display is exposed and is prone to scratch by hard objects.

For an existing flexible display, components such as a base, a panel, a synchronizing mechanism, and a lifting plate always need to be provided in a bending area in the middle of a supporting apparatus, so that left and right parts of the flexible display can rotate synchronously and change between an unfolded state and a folded state. When the flexible display is in the unfolded state, the panel is level with the lifting plate to level off the flexible display supported by the panel and the lifting plate. When the flexible display is in the folded state, on one hand, the panel rotates to form a specific inclination angle with the lifting plate; on the other hand, the lifting plate moves down, so that a bent part of the flexible display is folded into a structure similar to a "water drop shape". Such "water drop-shaped" part of the flexible display has a relatively large inward folding angle, thereby achieving higher reliability and a longer service life. However, currently, for an electronic device with this type of flexible display, if a lifting stroke of the lifting plate is increased, a thickness of the electronic device in an unfolded state increases; and if the thickness of the electronic devices in the unfolded state is decreased, the lifting stroke of the lifting plate decreases. In other words, for the electronic device, the lifting stroke of the lifting plate and the thickness of the electronic device in the unfolded state cannot be taken into consideration at the same time.

SUMMARY

Embodiments of this application provide a rotating mechanism, a supporting apparatus, and an electronic device, where both a lifting stroke of a lifting plate and a thickness of an electronic device in an unfolded state can be taken into consideration.

To achieve the foregoing objective, the following technical solutions are used in the embodiments of this application.

According to a first aspect, some embodiments of this application provide a rotating mechanism. The rotating mechanism includes a base, a first connecting piece, a second connecting piece, a lifting plate, a force applying structure, and a supporting structure. Both the first connecting piece and the second connecting piece are rotatably connected to the base. The lifting plate is located between the first connecting piece and the second connecting piece. The lifting plate is provided with a fitting surface, and the fitting surface is used for fitting a part of a flexible display. The lifting plate is provided with a lifting space, the force applying structure is located on at least one side in a circumference of the lifting space, and the force applying structure is connected to the lifting plate. The first connecting piece and the second connecting piece can rotate between an unfolding position and a folding position relative to the base. When the first connecting piece and the second connecting piece are in the unfolding position, the force applying structure applies, to the lifting plate, a tensile force from the lifting plate to a side of the lifting plate away from the fitting surface. The lifting plate is supported on the supporting structure, and the supporting structure applies, to the lifting plate, a first supporting force that counterbalances the tensile force.

In the rotating mechanism provided in the embodiments of this application, the force applying structure cooperates with the supporting structure to drive the lifting plate to move up and down. In addition, the force applying structure is provided on at least one side in the circumference of the lifting space, preventing the force applying structure from entering the lifting space of the lifting plate. In this way, on one hand, a lifting stroke of the lifting plate can be increased when the supporting apparatus has a specific thickness in an unfolded state. On the other hand, the supporting apparatus has a relatively small thickness in the unfolded state when there is a specific lifting stroke of the lifting plate. This is favorable for thin design of an electronic device in the unfolded state. In other words, in the rotating mechanism provided in the embodiments of this application, both the lifting stroke of the lifting plate and a thickness of the electronic device in the unfolded state can be taken into consideration.

In a possible implementation of the first aspect, when the first connecting piece and the second connecting piece rotate from the unfolding position to the folding position, the supporting structure moves away from the fitting surface to withdraw the first supporting force, and the lifting plate moves down under an action of the tensile force from the force applying structure. When the first connecting piece and the second connecting piece rotate from the folding position to the unfolding position, the supporting structure moves towards the fitting surface to apply a second supporting force to the lifting plate, where the second supporting force can overcome the tensile force from the force applying structure to push the lifting plate to move up.

In a possible implementation of the first aspect, the force applying structure includes a first force applying structure and a second force applying structure. The first force applying structure and the second force applying structure are located on two opposite sides in the circumference of the lifting space. When the first connecting piece and the second connecting piece are in the unfolding position, the first force applying structure and the second force applying structure each apply, to the lifting plate, a tensile force from the lifting plate to a side of the lifting plate away from the fitting surface. In this way, the forces applied to the opposite sides of the lifting plate are balanced. This can prevent the lifting plate from inclining during a process in which the lifting plate moves up and down. In addition, the force applying structure includes fewer parts, helping reduce structural complexity of the rotating mechanism.

In a possible implementation of the first aspect, the first connecting piece is rotatably connected to the base by using a first rotating shaft, and the second connecting piece is rotatably connected to the base by using a second rotating shaft. The first rotating shaft is parallel with the second rotating shaft. The first force applying structure is a first torsion spring, and the second force applying structure is a second torsion spring. The first torsion spring includes a first spiral body and a first torsion arm. The first spiral body is sleeved on the first rotating shaft. One end of the first spiral body is fastened relative to the base, one end of the first torsion arm is fastened to the other end of the first spiral body, and the other end of the first torsion arm is fastened to the lifting plate. The second torsion spring includes a second spiral body and a second torsion arm. The second spiral body is sleeved on the second rotating shaft. One end of the second spiral body is fastened relative to the base, one end of the second torsion arm is fastened to the other end of the second spiral body, and the other end of the second torsion arm is fastened to the lifting plate. When the first connecting piece and the second connecting piece are in the unfolding position, the first torsion arm and the second torsion arm are in a deformed state of swinging towards the fitting surface, so as to apply, to the lifting plate, an elastic tensile force from the lifting plate to a side of the lifting plate away from the fitting surface. In this embodiment, both the first force applying structure and the second force applying structure are torsion springs, the first spiral body of the first force applying structure is sleeved on the first rotating shaft, and the second spiral body of the second force applying structure is sleeved on the second rotating shaft. Therefore, in this embodiment, the first force applying structure and the second force applying structure are respectively installed in peripheral spaces of the first rotating shaft and the second rotating shaft. In this way, there is no need to additionally provide a special space for installing the force applying structure. This can further reduce the thickness of the supporting apparatus and increase the lifting stroke of the lifting plate.

In a possible implementation of the first aspect, when the first connecting piece and the second connecting piece are in the unfolding position, swing-deformation angles of the first torsion arm and the second torsion arm toward the fitting surface are greater than 0° and equal to or less than 85°. Optionally, the swing-deformation angle is 45°. This facilitates control of a falling height of the lifting plate.

In a possible implementation of the first aspect, the other end of the first torsion arm is slidably connected to the lifting plate in a first direction. The first direction is parallel with the lifting plate and perpendicular to the first rotating shaft. The other end of the second torsion arm is slidably connected to the lifting plate in the first direction. In this way, movement flexibility of the first torsion arm and the second torsion arm can be improved, ensuring lifting stability of the lifting plate.

In a possible implementation of the first aspect, a mounting part is provided on the first torsion arm. A hook is provided on a surface of the lifting plate away from the fitting surface, and the hook is provided with a guiding section that extends in the first direction. The first torsion arm is mounted to the hook by using the mounting part, and can slide along the guiding section. In this way, the first torsion arm is slidably connected to the lifting plate. The structure is simple and easy to implement.

In a possible implementation of the first aspect, the first spiral body includes a first spiral part and a second spiral part, the first spiral part and the second spiral part are sleeved on the first rotating shaft, and the first spiral part and the second spiral part are separated from each other in a length direction of the first rotating shaft. One end of the first spiral part close to the second spiral part is a first end of the first spiral part, and one end of the second spiral part close to the first spiral part is a first end of the second spiral part. The first torsion arm is n-shaped, two ends of the first torsion arm are respectively fastened to the first end of first spiral part and the first end of the second spiral part, and a middle bent part of the first torsion arm forms the mounting part. The structure of the mounting part is simple and easy to implement.

In a possible implementation of the first aspect, one end of the first spiral part away from the second spiral part is a second end of the first spiral part. One end of the second spiral part away from the first spiral part is a second end of the second spiral part. The first spiral body is fastened to the base by using the second end of the first spiral part and the second end of the second spiral part. In this way, the first force applying structure is symmetrically designed, and the first spiral body can be fastened to the base by using the two ends, ensuring that the first spiral body is stably fastened to the base.

In a possible implementation of the first aspect, the first force applying structure is a first spring piece, and the second force applying structure is a second spring piece. The first spring piece and the second spring piece each may be a flat phosphor bronze steel belt, a flat tin bronze steel belt, or a flat steel belt with a grade of 65mn, 55Si2Mn, 60Si2MnA, 55SiMnVB, 55SiMnMoV, 60CrMn, 60CrMnB, 302, 316, or the like. One end of the first spring piece and one end of the second spring piece are fastened relative to the base, and the other end of the first spring piece and the other end of the second spring piece are connected to the lifting plate. When the first connecting piece and the second connecting piece are in the unfolding position, the first spring piece and the second spring piece are in a deformed state of bending towards the fitting surface, so as to apply, to the lifting plate, an elastic tensile force from the lifting plate to a side of the lifting plate away from the fitting surface. In this embodiment, the first force applying structure and the second force applying structure have relatively small thicknesses and occupy less space, so as to reduce the thickness of the electronic device in the unfolded state.

Based on the foregoing implementation, optionally, a guiding chute is provided in a side wall of the lifting plate, and the end that is of the first spring piece and that is connected to the lifting plate extends into the guiding chute, and can slide along the guiding chute. In this way, on one hand, no part of the first spring piece extends into the lifting space, so that the lifting stroke of the lifting plate can be maximized, and the thickness of the electronic device in the unfolded state can be reduced. On the other hand, a part of the first spring piece can be accommodated and hidden in the guiding chute, reducing a space occupied by the first spring piece in the rotating mechanism.

In a possible implementation of the first aspect, the first force applying structure is a first spiral spring and the second force applying structure is a second spiral telescopic spring. One end of the first spiral spring and one end of the second spiral telescopic spring in their stretching directions are connected to the base, and the other end of the first spiral spring and the other end of the second spiral telescopic spring in their stretching directions are connected to the lifting plate. When the first connecting piece and the second connecting piece are in the unfolding position, the first spiral spring and the second spiral telescopic spring are in an elongated and deformed state, so as to apply, to the lifting plate, an elastic tension force from the lifting plate to a side of the lifting plate away from the fitting surface. In this embodiment, the first force applying structure and the second force applying structure are of a simple structure and easy to implement.

In a possible implementation of the first aspect, both the first spiral spring and the second spiral telescopic spring are spiral extension springs. An extension spring is mainly used to withstand a tensile force and has relatively high reliability.

In a possible implementation of the first aspect, the first force applying structure includes a first magnet and a first magnetic sheet, and the second force applying structure includes a second magnet and a second magnetic sheet. One of the first magnet and the first magnetic sheet is fastened relative to the base, and the other of the first magnet and the first magnetic sheet is fastened relative to the lifting plate. One of the second magnet and the second magnetic sheet is fastened relative to the base, and the other of the second magnet and the second magnetic sheet is fastened relative to the lifting plate. When the first connecting piece and the second connecting piece are in the unfolding position, the first magnet and the first magnetic sheet are separated from each other and there is a magnetic attraction therebetween, and the second magnet and the second magnetic sheet are separated from each other and there is a magnetic attraction therebetween, so as to apply, to the lifting plate, a magnetic attraction force from the lifting plate to a side of the lifting plate away from the fitting surface. In this embodiment, the first force applying structure and the second force applying structure each include two structural parts separated from each other. The two structural parts are independent from each other, so that flexibility of position arrangement is improved.

In a possible implementation of the first aspect, the supporting apparatus includes a first supporting arm and a second supporting arm. The first supporting arm is fastened relative to the first connecting piece, and the second supporting arm is fastened relative to the second connecting piece. When the first connecting piece and the second connecting piece rotate from the unfolding position to the folding position, the first supporting arm and the second supporting arm are driven to rotate away from the fitting surface to withdraw the first supporting force. When the first connecting piece and the second connecting piece rotate from the folding position to the unfolding position, the first supporting arm and the second supporting arm are driven to rotate towards the fitting surface to apply the second supporting force to the lifting plate. In this embodiment, the two supporting arms are configured to support the lifting plate, thereby achieving relatively high supporting stability.

In a possible implementation of the first aspect, the first connecting piece is fastened to the first rotating shaft, and the first rotating shaft is rotatably connected to the base with itself as an axis. The second connecting piece is fastened to the second rotating shaft, and the second rotating shaft is rotatably connected to the base with itself as an axis. The first supporting arm is fastened to the first rotating shaft, and the second supporting arm is fastened to the second rotating shaft.

In a possible implementation of the first aspect, a first flat position is provided on a side surface of the first rotating shaft, a flat hole is provided in the first supporting arm, and the first supporting arm is sleeved on the first rotating shaft through the flat hole in a coordinated manner. There may be one or more first flat positions. In some embodiments, there are two first flat positions, and the two first flat positions are respectively provided at two ends of the first rotating shaft in a radial direction. In other embodiments, there may be one first flat position. The first supporting arm is provided with a flat hole, and the first supporting arm passes through the first rotating shaft through the flat hole in a coordinated manner. In this way, the first supporting arm is prevented from rotating around the first rotating shaft, so that the first supporting arm is fastened relative to the first rotating shaft. In this fastening manner, relatively high stability of the connection between the first supporting arm and the first rotating shaft is achieved. In addition, it is convenient for installation, assembly difficulty of the rotating mechanism can be reduced, and assembly efficiency of the rotating mechanism can be improved.

In a possible implementation of the first aspect, a first gear is fastened to the first rotating shaft, and a central axis of the first gear coincides with a central axis of the first rotating shaft. A second gear is fastened to the second rotating shaft, and a central axis of the second gear coincides with a central axis of the second rotating shaft. The first gear and the second gear have a same diameter, and the first gear and the second gear are meshed for driving. Alternatively, an even number of intermediate gears are provided between the first gear and the second gear, and the first gear, the even number of intermediate gears, and the second gear are sequentially meshed for driving. In this way, the first connecting piece and the second connecting piece can be driven by using the first gear and the second gear or by using the first gear, the even number of intermediate gears, and the second gear, to synchronously rotate in an opposite direction. Therefore, the first connecting piece and the second connecting piece can be driven to move synchronously.

In a possible implementation of the first aspect, there are two intermediate gears. In this way, there are an appropriate quantity of intermediate gears, and both a height and structural complexity of the rotating mechanism can be taken into consideration.

According to a second aspect, some embodiments of this application provide a supporting apparatus. The supporting apparatus includes a first housing, a second housing, and the rotating mechanism described in any one of the foregoing technical solutions. The rotating mechanism is located between the first housing and the second housing, the first connecting piece of the rotating mechanism is connected to the first housing, and the second connecting piece of the rotating mechanism is connected to the second housing.

The supporting apparatus provided in the embodiments of this application includes the rotating mechanism described in any one of the foregoing technical solutions. Therefore, the supporting apparatus and the rotating mechanism can resolve the same technical problem and achieve the same effects.

According to a third aspect, some embodiments of this application provide an electronic device. The electronic device includes a flexible display and the supporting apparatus described in the foregoing technical solution. The flexible display includes a first part, a second part, and a third part, where the third part is located between the first part and the second part, the first part is supported by and fastened to the first housing, the second part is supported by and fastened to the second housing, and the third part is supported by and fastened to the rotating mechanism of the supporting apparatus.

The electronic device provided in the embodiments of this application includes the supporting apparatus described in the foregoing technical solution. Therefore, the electronic device and the supporting apparatus can resolve the same technical problem and achieve the same effects.

DETAILED DESCRIPTION OF EMBODIMENTS

In the embodiments of this application, the terms "first" and "second" are merely intended for a purpose of description, and shall not be understood as an indication or implication of relative importance or an implicit indication of a quantity of indicated technical features. Therefore, a feature defined by "first" or "second" may explicitly or implicitly include one or more features.

In the embodiments of this application, terms "comprise", "include", or any other variations thereof are intended to cover non-exclusive inclusions, so that a process, method, article, or apparatus including a series of elements includes not only those elements but also other elements not explicitly listed, or elements inherent to such a process, method, article, or apparatus. When there are no more limitations, an element defined by the statement "including a . . . " does not exclude existence of the same other elements in a process, method, article, or apparatus including the element.

This application provides an electronic device, where the electronic device is a type of electronic device with a flexible display. Specifically, the electronic device includes but is not limited to a mobile phone, a tablet computer (tablet personal computer), a laptop computer (laptop computer), a personal digital assistant (personal digital assistant, PDA), a personal computer, a notebook computer (notebook), a vehicle-mounted device, a wearable device (for example, a watch), or another electronic device.

Figure 1:
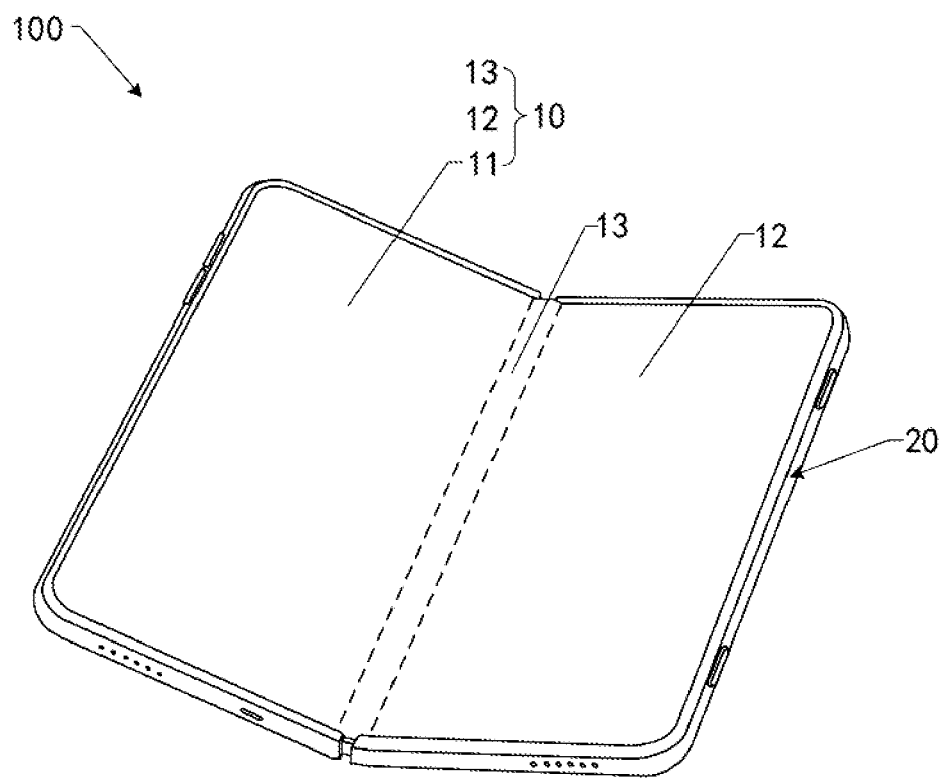
FIG. 1 is a stereogram of an electronic device according to some embodiments of this application.

FIG. 1 is a stereogram of an electronic device 100 according to some embodiments of this application. In this embodiment, the electronic device 100 is a mobile phone with a flexible display. The electronic device 100 includes a flexible display 10 and a supporting apparatus 20. It can be understood that, FIG. 1 merely shows an example of some components included in the electronic device 100. Actual shapes, actual sizes, actual positions, and actual structures of these components are not limited by FIG. 1.

The flexible display 10 is configured to display an image, a video, and the like. The flexible display 10 may be folded into a first part 11 and a second part 12. The flexible display 10 further includes a third part 13 located between the first part 11 and the second part 12. At least the third part 13 of the flexible display 10 is made of a flexible material. The first part 11 and the second part 12 may be made of a flexible material or a rigid material, or partially made of a rigid material and partially made of a flexible material. This is not specifically limited herein.

Specifically, the flexible display 10 may be an organic light-emitting diode (organic light-emitting diode, OLED) display, a micro organic light-emitting diode (micro organic light-emitting diode) display, a quantum dot light-emitting diodes (quantum dot light-emitting diodes, QLED) display, a liquid crystal display (liquid crystal display, LCD), or the like.

The flexible display 10 can switch between an unfolded state and a folded state.

Figure 2:
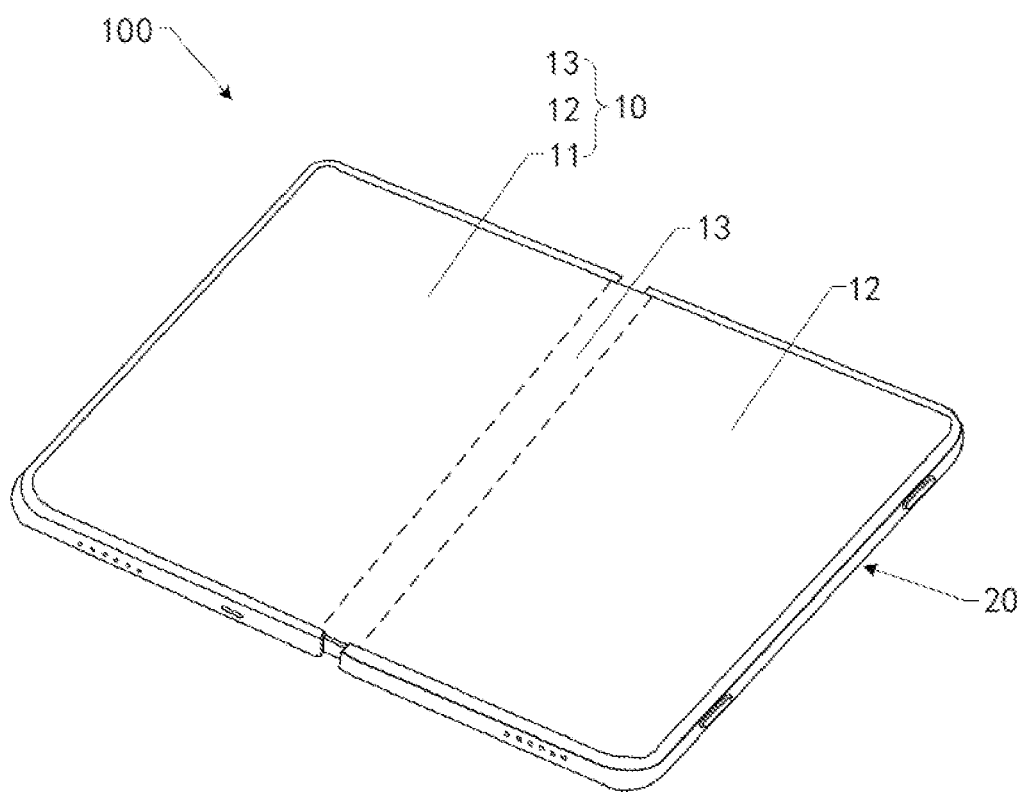
FIG. 2 is a schematic structural diagram of the electronic device shown in FIG. 1 when a flexible display is in an unfolded state.

FIG. 2 is a schematic structural diagram of the electronic device 100 shown in FIG. 1 when the flexible display 10 is in the unfolded state. When the flexible display 10 is in the unfolded state, the first part 11, the second part 12, and the third part 13 are coplanar and face a same direction. In this state, large-screen display can be implemented, providing richer information and better experience to users.

Figure 3:
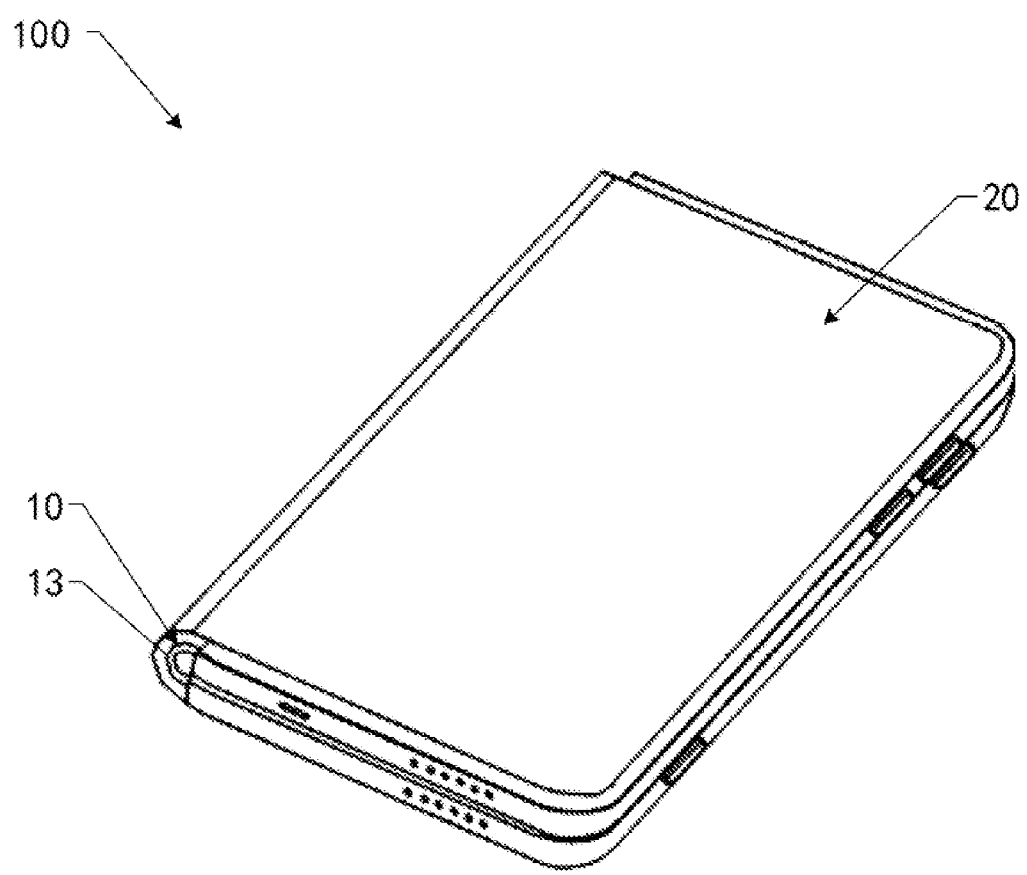
FIG. 3 is a schematic structural diagram of the electronic device shown in FIG. 1 when a flexible display is in a folded state.

FIG. 3 is a schematic structural diagram of the electronic device 100 shown in FIG. 1 when the flexible display 10 is in the folded state. When the flexible display 10 is in the folded state, the third part 13 is in a bent state, and the first part (not shown in the figure) and the second part (not shown in the figure) are opposite to each other. The flexible display 10 is invisible to users, and the supporting apparatus 20 is located outside the flexible display 10 for protecting the flexible display 10 from being scratched by hard objects.

Figure 4:
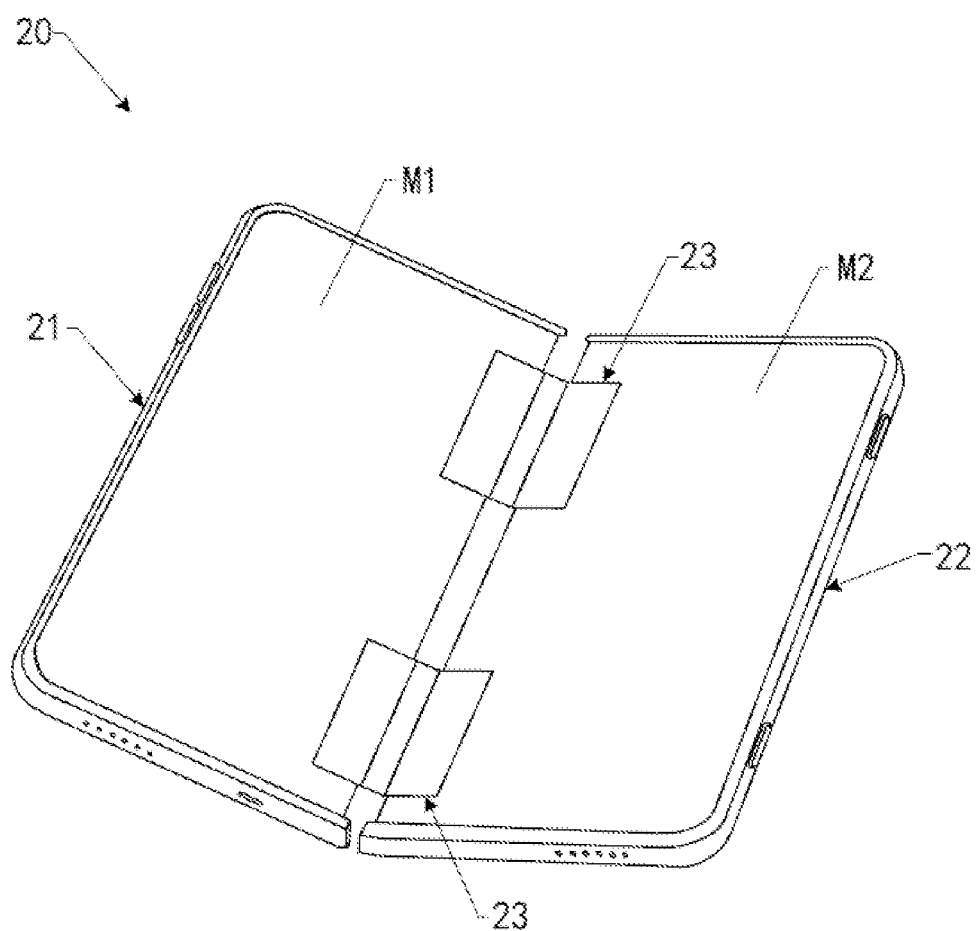
FIG. 4 is a stereogram of a supporting apparatus in the electronic device shown in FIG. 1.

The supporting apparatus 20 is configured to support the flexible display 10 and allow the flexible display 10 to switch between the unfolded state and the folded state. FIG. 4 is a stereogram of the supporting apparatus 20 in the electronic device 100 shown in FIG. 1. In this embodiment, the supporting apparatus 20 includes a first housing 21, a second housing 22, and a rotating mechanism 23. It can be understood that, FIG. 4 merely shows an example of some components included in the supporting apparatus 20. Actual shapes, actual sizes, actual positions, and actual structures of these components are not limited by FIG. 4.

The first housing 21 is configured to fasten and support the first part 11 of the flexible display 10 shown in FIG. 1. Specifically, the first housing 21 is provided with a fitting surface M1, and the first housing 21 is configured to fasten and support the first part 11 of the flexible display 10 shown in FIG. 1 by using the fitting surface M1.

The second housing 22 is configured to fasten and support the second part 12 of the flexible display 10 shown in FIG. 1. Specifically, the second housing 22 is provided with a fitting surface M2, and the second housing 22 is configured to fasten and support the second part 12 of the flexible display 10 shown in FIG. 1 by using the fitting surface M2.

A first accommodating chamber (not shown in the figure) is formed inside the first housing 21. A second accommodating chamber (not shown in the figure) is formed inside the second housing 22. The first accommodating chamber and the second accommodating chamber are configured to accommodate electronic components of the electronic device 100, for example, a main board, a battery, a camera module, a speaker, and an earpiece.

The first housing 21 may be an integral structure, or may be formed through assembly of a plurality of parts. Similarly, the second housing 22 may be an integral structure, or may be formed through assembly of a plurality of parts.

Figure 5:
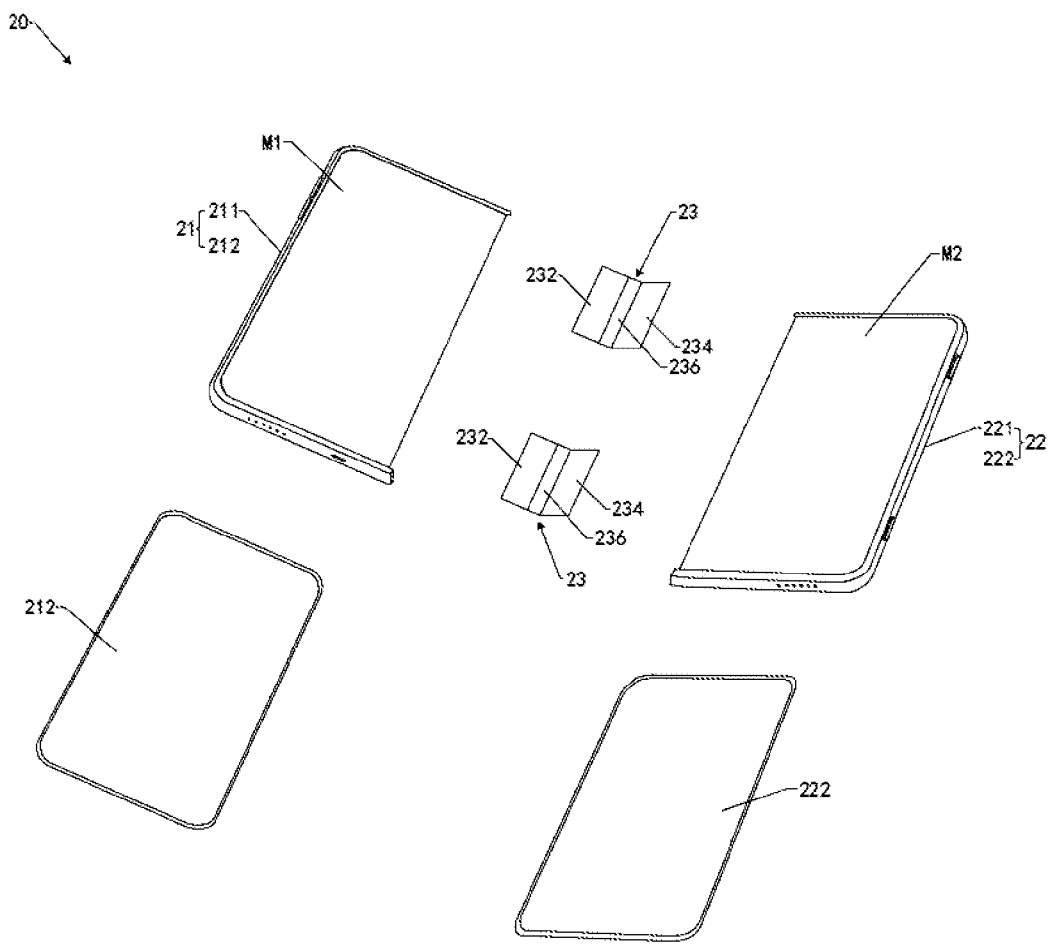
FIG. 5 is an exploded view of the supporting apparatus shown in FIG. 4.

In some embodiments, refer to FIG. 5. FIG. 5 is an exploded view of the supporting apparatus 20 shown in FIG. 4. The first housing 21 includes a first middle frame 211 and a first back cover 212. The fitting surface M1 is located on the first middle frame 211. The first back cover 212 is fastened to one side of the first middle frame 211 away from the fitting surface M1. The first accommodating chamber is formed between the first middle frame 211 and the first back cover 212.

The second housing 22 includes a second middle frame 221 and a second back cover 222. The fitting surface M2 is located on the second middle frame 221. The second back cover 222 is fastened to one side of the second middle frame 221 away from the fitting surface M2. The second accommodating chamber is formed between the second middle frame 221 and the second back cover 222.

The rotating mechanism 23 is configured to support the third part 13 of the flexible display 10. The rotating mechanism 23 is connected between the first housing 21 and the second housing 22. The first housing 21 and the second housing 22 are rotatably connected to each other by using the rotating mechanism 23. In some embodiments, the rotating mechanism 23 is connected between the first middle frame 211 of the first housing 21 and the second middle frame 221 of the second housing 22. In other embodiments, the rotating mechanism 23 may alternatively be connected between the first back cover 212 of the first housing 21 and the second back cover 222 of the second housing 22.

There may be one, two, or more rotating mechanisms 23. FIG. 4 and FIG. 5 merely show an example in which there are two rotating mechanisms 23, but this should not be construed as a special limitation on this application. The two rotating mechanisms 23 are separated from each other along a length direction of a folding shaft of the flexible display 10.

Figure 6A:
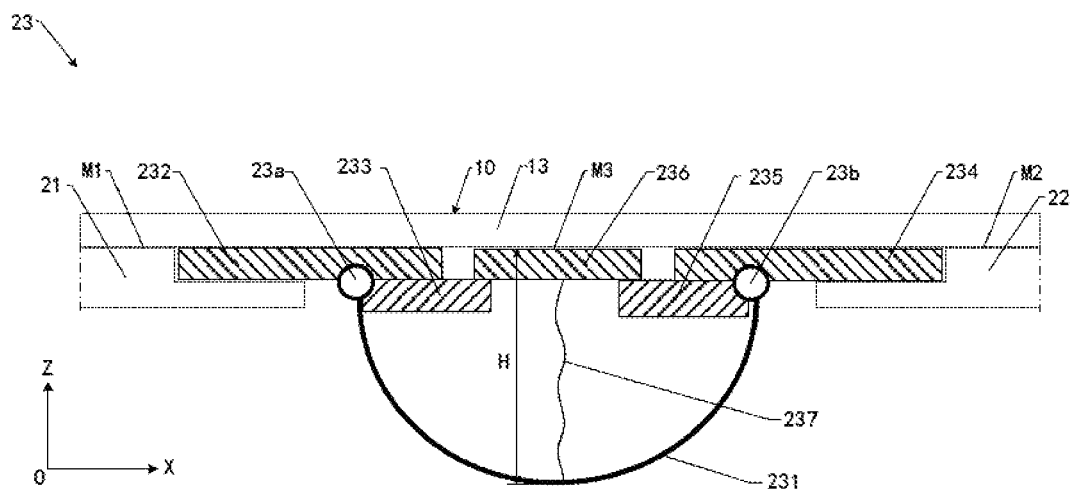
FIG. 6a is a schematic structural diagram of a rotating mechanism according to some embodiments of this application, where in FIG. 6a, a first connecting piece and a second connecting piece are in an unfolding position.

FIG. 6a is a schematic structural diagram of a rotating mechanism 23 according to some embodiments of this application. In this embodiment, the rotating mechanism 23 includes a base 231, a first connecting piece 232, a first supporting arm 233, a second connecting piece 234, a second supporting arm 235, a lifting plate 236, and a force applying structure 237. It should be noted that in FIG. 6a, structures belonging to the rotating mechanism 23 are drawn by solid lines and structures (for example, a flexible display 10, a first housing 21, and a second housing 22) not belonging to the rotating mechanism 23 are drawn by dotted lines.

The first connecting piece 232 is rotatably connected to the base 231 by using a first rotating shaft 23a. The first connecting piece 232 is configured to connect to the first housing 21. The first supporting arm 233 is fastened relative to the first connecting piece 232.

The second connecting piece 234 is rotatably connected to the base 231 by using a second rotating shaft 23b. The first rotating shaft 23a is parallel with the second rotating shaft 23b. The second connecting piece 234 is configured to connect to the second housing 22. The second supporting arm 235 is fastened relative to the second connecting piece 234.

Figure 6B:
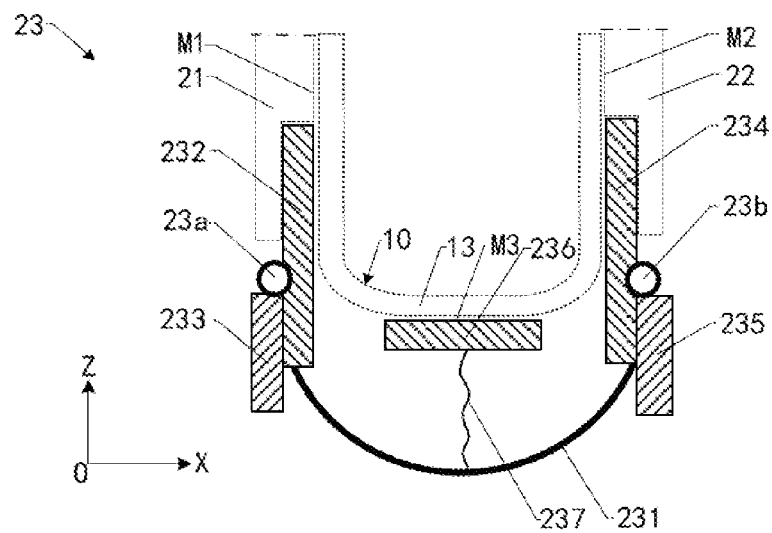
FIG. 6b is a schematic structural diagram of the rotating mechanism shown in FIG. 6a when the first connecting piece and the second connecting piece are in a folding position.

The lifting plate 236 is located between the first connecting piece 232 and the second connecting piece 234, and the lifting plate 236 is supported by the first supporting arm 233 and the second supporting arm 235. The lifting plate 236 is provided with a fitting surface M3, and the rotating mechanism 23 is configured to support a third part 13 of the flexible display 10 by using the fitting surface M3. The fitting surface M3, a fitting surface M1 of the first housing 21, and a fitting surface M2 of the second housing 22 are coplanar or approximately coplanar and face a same direction. In this case, the first connecting piece 232 and the second connecting piece 234 are in an unfolding position. The first connecting piece 232 and the second connecting piece 234 can rotate between the unfolding position and a folding position. When the first connecting piece 232 and the second connecting piece 234 are in the folding position, refer to FIG. 6b. FIG. 6b is a schematic structural diagram of the rotating mechanism 23 shown in FIG. 6a when the first connecting piece 232 and the second connecting piece 234 are in the folding position. The fitting surface M1 is opposite to the fitting surface M2, the fitting surface M1 is perpendicular to or approximately perpendicular to the fitting surface M3, and the fitting surface M2 is perpendicular to or approximately perpendicular to the fitting surface M3. It should be noted that in FIG. 6b, structures belonging to the rotating mechanism 23 are drawn by solid lines and structures (for example, the flexible display 10, the first housing 21, and the second housing 22) not belonging to the rotating mechanism 23 are drawn by dotted lines.

For ease of description of the following embodiments, an XYZ coordinate system is established. An extension direction of the first rotating shaft 23a in the rotating mechanism 23 is a Y-axis direction, a thickness direction of the lifting plate 236 is a Z-axis direction, and a direction in parallel with the lifting plate 236 and perpendicular to the first rotating shaft 23a is an X-axis direction. It can be understood that the coordinate system for the rotating mechanism 23 may be flexibly set based on actual needs. This application merely shows an example, but this should not be construed as a special limitation on this application.

The force applying structure 237 is located on a side of the lifting plate 236 away from the fitting surface M3, and is directly opposite the lifting plate 236. In other words, the force applying structure 237 is directly below the lifting plate 236. The force applying structure 237 is connected to the lifting plate 236. The force applying structure 237 is configured to apply, to the lifting plate 236, a tensile force away from the fitting surface M3. When the first connecting piece 232 and the second connecting piece 234 rotate from the unfolding position to the folding position, a supporting force applied by the first supporting arm 233 and the second supporting arm 235 to the lifting plate 236 is gradually withdrawn. The tensile force can drive the lifting plate 236 to move down away from the fitting surface M3, so as to keep away from the flexible display 10. When the first connecting piece 232 and the second connecting piece 234 rotate from the folding position to the unfolding position, the first supporting arm 233 and the second supporting arm 235 apply an upward supporting force to the lifting plate 236. The supporting force can overcome the tensile force from the force applying structure 237, so as to raise the fitting surface M3 of the lifting plate 236 to a position in level with the fitting surface M1 and the fitting surface M2.

The force applying structure 237 may have a plurality of structural forms. In some embodiments, still referring to FIG. 6a, the force applying structure 237 is a spiral spring. The spiral spring extends in a vertical direction (that is, the Z-axis direction). An upper end of the spiral spring is connected to the lifting plate 236, and a lower end of the spiral spring is connected to the base 231. The spiral spring is in an elongated and deformed state to apply a downward elastic force to the lifting plate 236. The elastic force is the foregoing tensile force. In some other embodiments, the force applying structure 237 includes a magnet (not shown in the figure) and a magnetic sheet (not shown in the figure). The magnet and the magnetic sheet are arranged in the vertical direction (that is, the Z-axis direction). One of the magnet and the magnetic sheet is fastened to the lifting plate 235, and the other of the magnet and the magnetic sheet is fastened to the base 231. There is a magnetic attraction between the magnet and the magnetic sheet to apply, to the lifting plate 236, a magnetic attraction force away from the fitting surface M3. The magnetic attraction force is the foregoing tensile force.

It can be learned from the foregoing embodiment that, the force applying structure 237 is located directly below the lifting plate 236. In other words, the force applying structure 237 is located in a lifting path of the lifting plate 236. In this way, on one hand, the force applying structure 237 affects a lifting stroke of the lifting plate 236 when the supporting apparatus 20 has a specific thickness H in an unfolded state. On the other hand, the supporting apparatus 20 has a relatively large thickness H in the unfolded state when there is a specific lifting stroke of the lifting plate 236. This is not favorable for thin design of an electronic device 100 in the unfolded state. In other words, the lifting stroke of the lifting plate and a thickness of the electronic device in the unfolded state cannot be taken into consideration at the same time in the foregoing embodiment.

Figure 7:
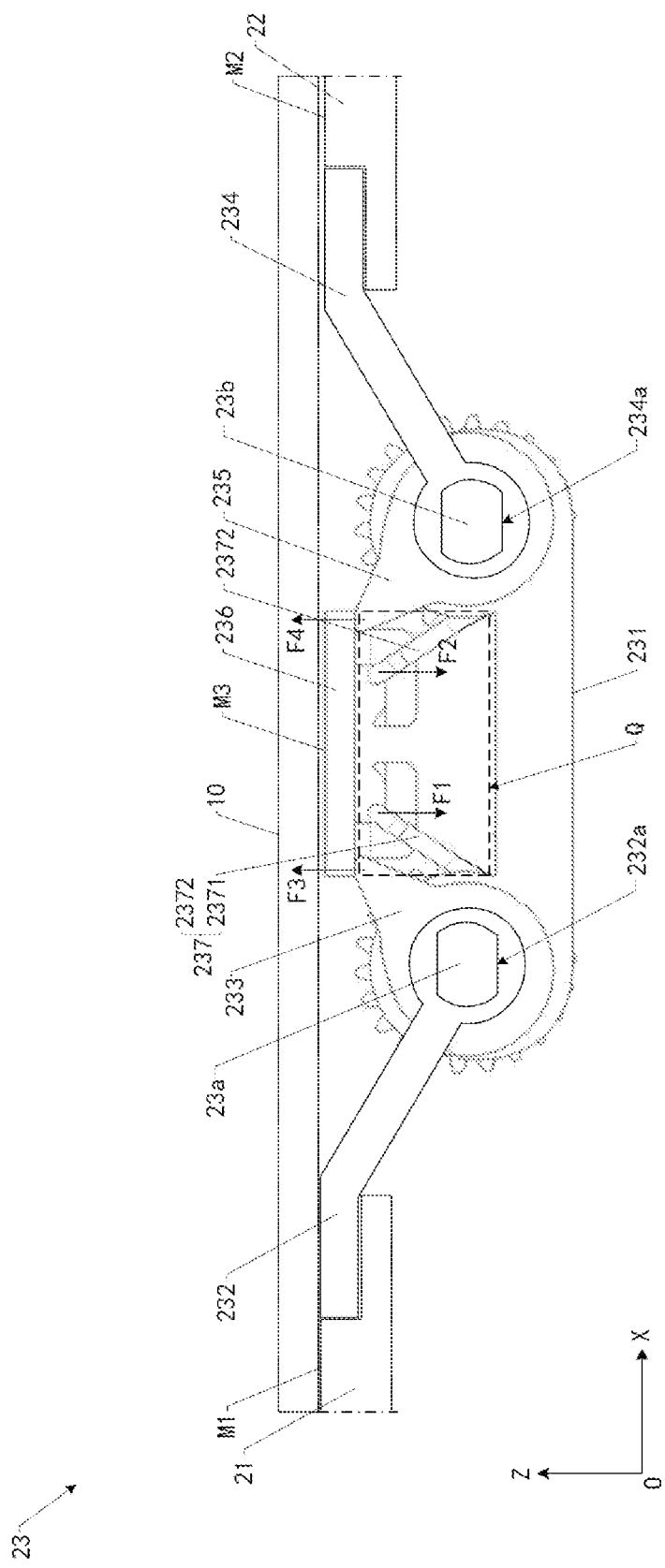
FIG. 7 is a main view of a rotating mechanism when a first connecting piece and a second connecting piece are in an unfolding position according to some other embodiments of this application.

To resolve the foregoing problem, refer to FIG. 7. FIG. 7 is a main view of a rotating mechanism 23 when a first connecting piece 232 and a second connecting piece 234 are in an unfolding position according to some other embodiments of this application. In this embodiment, the rotating mechanism 23 includes a base 231, the first connecting piece 232, the second connecting piece 234, a lifting plate 236, a force applying structure 237, and a supporting structure.

It can be understood that, FIG. 7 merely shows an example of some components included in the rotating mechanism 23. Actual shapes, actual sizes, actual positions, and actual structures of these components are not limited by FIG. 7. In addition, it should be noted that in FIG. 7, structures belonging to the rotating mechanism 23 are drawn by solid lines and structures (for example, a flexible display 10, a first housing 21, and a second housing 22) not belonging to the rotating mechanism 23 are drawn by dotted lines.

The first connecting piece 232 is rotatably connected to the base 231.

In some embodiments, the first connecting piece 232 is rotatably connected to the base 231 by using a first rotating shaft 23a. Specifically, manners in which the first connecting piece 232 is rotatably connected to the base 231 by using the first rotating shaft 23a may include the following Example 1 and Example 2.

Example 1

Figure 8:
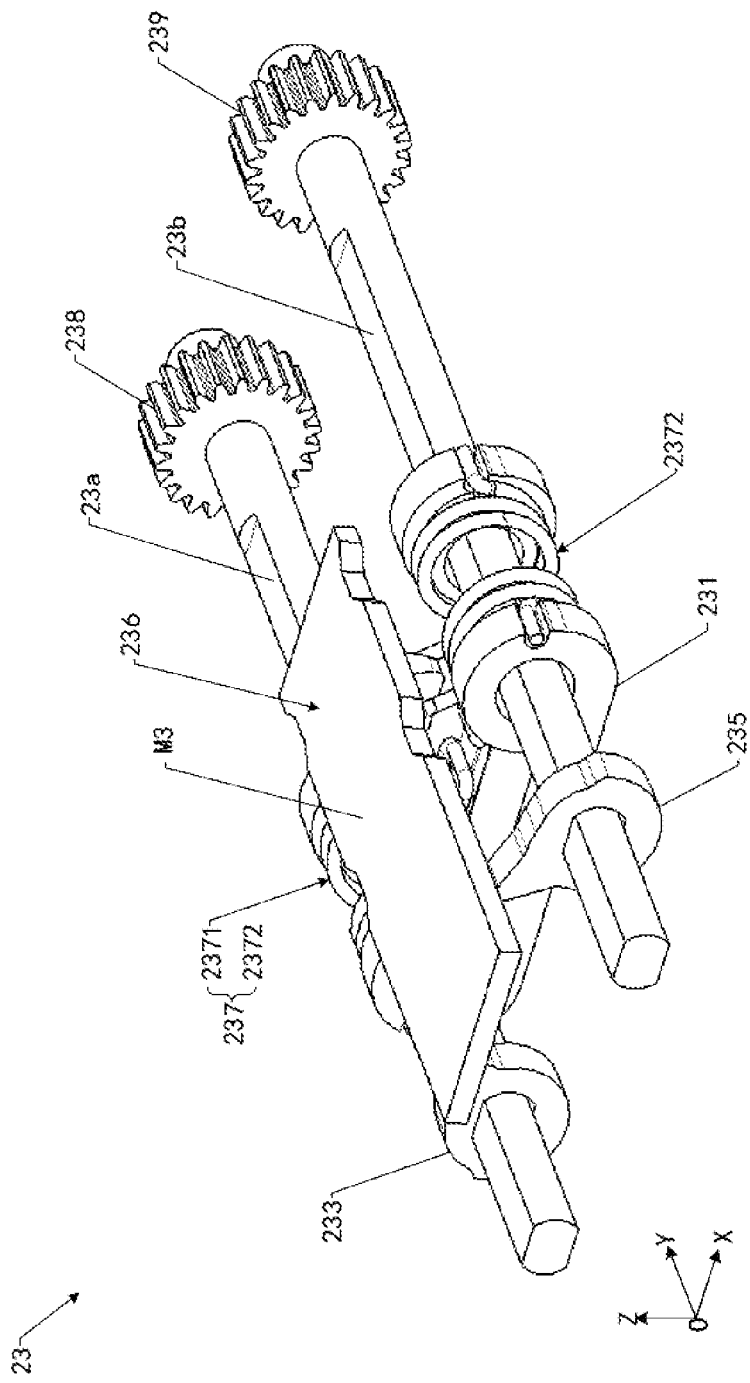
FIG. 8 is a stereogram of the rotating mechanism (the first connecting piece and the second connecting piece are not shown) shown in FIG. 7.
Figure 9:
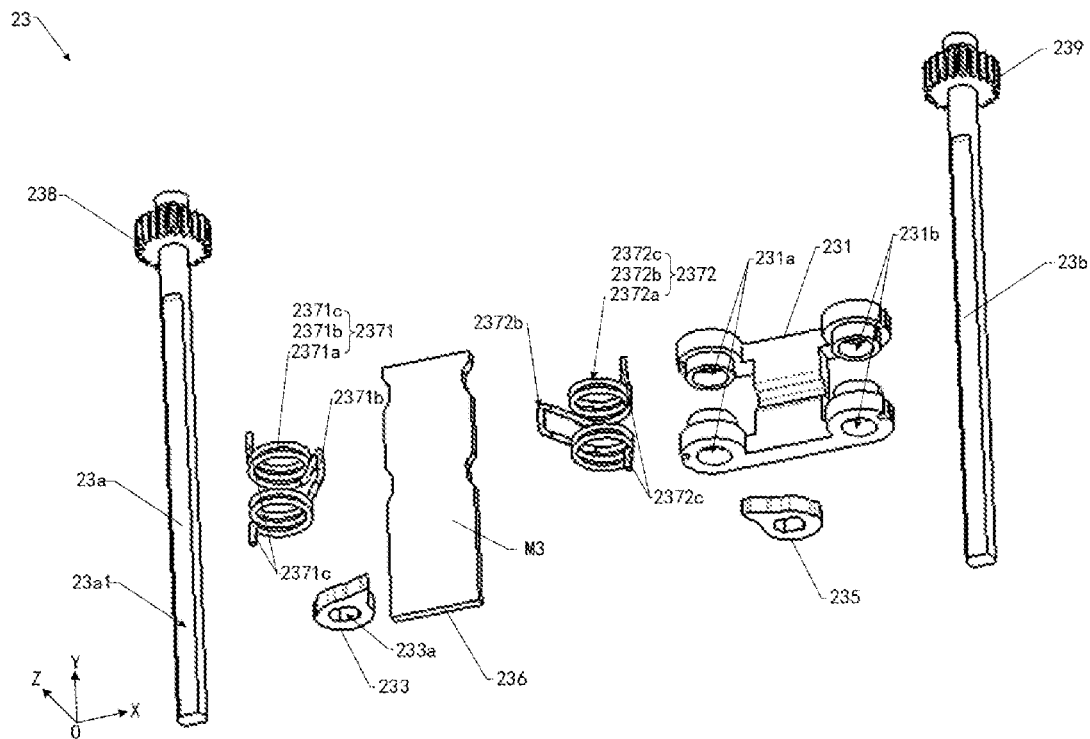
FIG. 9 is an exploded view of the rotating mechanism shown in FIG. 8.

Referring to FIG. 7, the first connecting piece 232 is fastened to the first rotating shaft 23a. Optionally, the first connecting piece 232 is provided with a fastening hole 232a, and the first connecting piece 232 passes through the first rotating shaft 23a through the fastening hole 232a. The fastening hole 232a is fastened relative to the first rotating shaft 23a by using a flat position, so as to prevent the first connecting piece 232 from rotating around the first rotating shaft 23a. In this embodiment and the following embodiments, a "flat position" refers to a flat part whose side surface is formed in a processing manner such as milling processing, and a shaft with a flat position is also referred to as a flat shaft. Corresponding to the flat shaft, a flat position may also be provided on an inner wall of a hole. The hole with the flat position is also referred to as a flat hole. The flat hole and the flat shaft can cooperate with each other to prevent relative rotation between a hole and a shaft. In some other embodiments, the fastening hole 232a and the first rotating shaft 23a may be fastened to each other in a manner such as interference fit or welding, so as to prevent the first connecting piece 232 from rotating around the first rotating shaft 23a. On this basis, the first rotating shaft 23a is rotatably connected to the base 231 with itself as an axis. Specifically, in some embodiments, refer to FIG. 8 and FIG. 9. FIG. 8 is a stereogram of the rotating mechanism 23 shown in FIG. 7, and FIG. 9 is an exploded view of the rotating mechanism 23 shown in FIG. 8. The first connecting piece 232 and the second connecting piece 234 are not shown in FIG. 8 and FIG. 9. A first rotation hole 231a is provided in the base 231, and the first rotating shaft 23a passes through the first rotation hole 231a and can rotate in the first rotation hole 231a. In this way, when the first connecting piece 232 rotates relative to the base 231, the first rotating shaft 23a also rotates.

Example 2

A rotation hole is provided in the first connecting piece 232, and the first connecting piece 232 is sleeved on the first rotating shaft 23a through the rotation hole and can rotate around the first rotating shaft 23a. The first rotating shaft 23a is fastened to the base 231. In this way, when the first connecting piece 232 rotates relative to the base 231, the first rotating shaft 23a is stationary relative to the base 231.

It should be noted that, texts and accompanying drawings in the following embodiments are all described based on Example 1, but this should not be construed as a special limitation on this application.

Referring back to FIG. 7, the first connecting piece 232 is configured to connect to the first housing 21. Specifically, the first connecting piece 232 may be fastened to the first housing 21 in a manner such as welding, riveting, or threaded connection, or may be slidably or rotatably connected to the first housing 21. The first connecting piece 232 may be directly connected to the first housing 21, or may be indirectly connected to the first housing 21 by using another intermediate structure. It should be noted that, in the embodiment shown in FIG. 7 and the following embodiments, the descriptions are provided by only using an example in which the first connecting piece 232 is directly fixedly connected to the first housing 21 in a manner such as threaded connection, riveting, or welding, but this should not be construed as a special limitation on this application.

The second connecting piece 234 is rotatably connected to the base 231. A rotation axis of the first connecting piece 232 and the base 231 is a first rotation axis, a rotation axis of the second connecting piece 234 and the base 231 is a second rotation axis, and the second rotation axis is parallel with the first rotation axis.

In some embodiments, the second connecting piece 234 is rotatably connected to the base 231 by using a second rotating shaft 23b. Specifically, manners in which the second connecting piece 234 is rotatably connected to the base 231 by using the second rotating shaft 23b may include the following Example 3 and Example 4.

Example 3

Referring to FIG. 7, the second connecting piece 234 is fastened to the second rotating shaft 23b. Optionally, the second connecting piece 234 is provided with a fastening hole 234a, and the second connecting piece 234 passes through the second rotating shaft 23b through the fastening hole 234a. The fastening hole 234a is fastened relative to the second rotating shaft 23b by using a flat position, so as to prevent the second connecting piece 234 from rotating around the second rotating shaft 23b. In some other embodiments, the fastening hole 234a and the second rotating shaft 23b may be fastened to each other in a manner such as interference fit or welding, so as to prevent the second connecting piece 234 from rotating around the second rotating shaft 23b. On this basis, the second rotating shaft 23b is rotatably connected to the base 231 with itself as an axis. Specifically, in some embodiments, referring to FIG. 9, the base 231 is provided with a second rotation hole 231b, and the second rotating shaft 23b passes through the second rotation hole 231b, and can rotate in the second rotation hole 231b. In this way, when the second rotating shaft 23b rotates relative to the base 231, the second rotating shaft 23b also rotates.

Example 4

A rotation hole is provided in the second connecting piece 234, and the second connecting piece 234 is sleeved on the second rotating shaft 23b through the rotation hole, and can rotate around the second rotating shaft 23b. The second rotating shaft 23b is fastened to the base 231. In this way, when the second connecting piece 234 rotates relative to the base 231, the second rotating shaft 23b is stationary relative to the base 231.

It should be noted that, texts and accompanying drawings of the following embodiments are all described based on Example 3, but this should not be construed as a special limitation on this application.

Referring back to FIG. 7, the second connecting piece 234 is configured to connect to the second housing 22. Specifically, the second connecting piece 234 may be fastened to the second housing 22 in a manner such as welding, riveting, or threaded connection, or may be slidably or rotatably connected to the second housing 22. The second connecting piece 234 may be directly connected to the second housing 22, or may be indirectly connected to the second housing 22 by using another intermediate structure. It should be noted that, in the embodiment shown in FIG. 7 and the following embodiments, the descriptions are provided by only using an example in which the second connecting piece 234 is directly fixedly connected to the second housing 22 in a manner such as threaded connection, riveting, or welding, but this should not be construed as a special limitation on this application.

The first rotating shaft 23a and the second rotating shaft 23b may be merely used as rotating shafts, or may be used as gear shafts for driving synchronous movement of the first connecting piece 232 and the second connecting piece 234. In some embodiments, referring to FIG. 8 and FIG. 9, a first gear 238 is fastened to the first rotating shaft 23a. A central axis of the first gear 238 coincides with a central axis of the first rotating shaft 23a. A second gear 239 is fastened to the second rotating shaft 23b. A central axis of the second gear 239 coincides with a central axis of the second rotating shaft 23b. The first gear 238 and the second gear 239 have a same diameter. The first gear 238 and the second gear 239 are meshed for driving. Alternatively, an even number of intermediate gears are provided between the first gear 238 and the second gear 239, and the first gear 238, the even number of intermediate gears, and the second gear 239 are sequentially meshed for driving. In this way, the first connecting piece 232 and the second connecting piece 234 can be driven by using the first gear 238 and the second gear 239 or by using the first gear 238, the even number of intermediate gears, and the second gear 239, to synchronously rotate in an opposite direction. Therefore, the first connecting piece 232 and the second connecting piece 234 can be driven to move synchronously.

Figure 10:
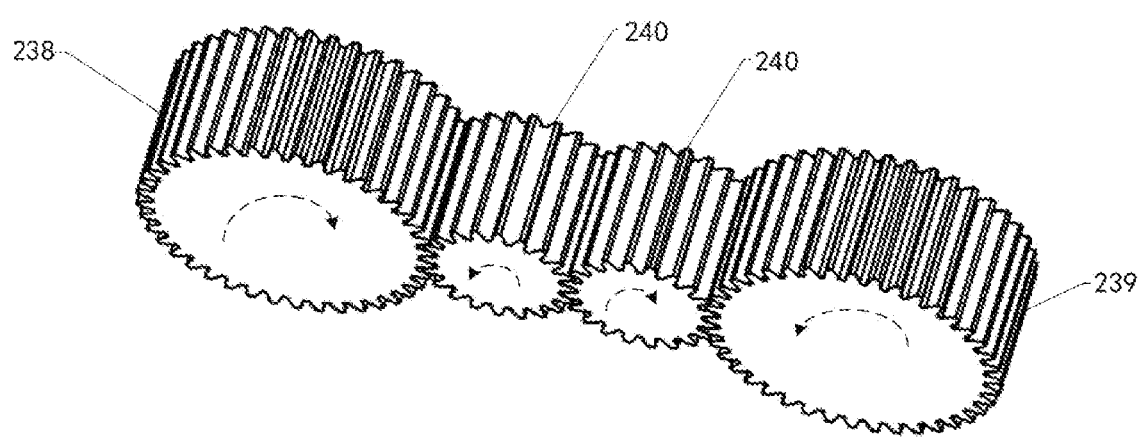
FIG. 10 is a diagram of assembly of a first gear, intermediate gears, and a second gear in a rotating mechanism according to some embodiments of this application.

In the foregoing embodiment, there may be two, four, six, or more intermediate gears. As a quantity of intermediate gears increases, diameters of the intermediate gears, a diameter of the first gear 238, and a diameter of the second gear 239 can be designed to be smaller, so as to reduce a height of the rotating mechanism 23 in a Z-axis direction. However, as the quantity of intermediate gears increases, structural complexity of the rotating mechanism 23 is increased. Therefore, to take into consideration both the height and the structural complexity of the rotating mechanism 23, in some embodiments, refer to FIG. 10. FIG. 10 is a diagram of assembly of a first gear 238, intermediate gears 340, and a second gear 239 in a rotating mechanism 23 according to some embodiments of this application. In this embodiment, there are two intermediate gears 340. In this way, there are an appropriate quantity of intermediate gears 340, and both a height and structural complexity of the rotating mechanism 23 can be taken into consideration.

Referring back to FIG. 7, the lifting plate 236 is located between the first connecting piece 232 and the second connecting piece 234. The lifting plate 236 is provided with a fitting surface M3, and the rotating mechanism 23 is configured to support a third part 13 of the flexible display 10 by using the fitting surface M3. The fitting surface M3, a fitting surface M1 of the first housing 21, and a fitting surface M2 of the second housing 22 are coplanar or approximately coplanar and face a same direction. In this case, the first connecting piece 232 and the second connecting piece 234 are in an unfolding position. The first connecting piece 232 and the second connecting piece 234 can rotate between the unfolding position and a folding position. As shown in (b) in FIG. 16, when the first connecting piece 232 and the second connecting piece 234 are in the folding position, the fitting surface M1 is opposite to the fitting surface M2, the fitting surface M1 is perpendicular to or approximately perpendicular to the fitting surface M3, and the fitting surface M2 is perpendicular to or approximately perpendicular to the fitting surface M3.

Still referring to FIG. 7, the lifting plate 236 is provided with a lifting space Q. The lifting space Q is a space area enclosed by a dashed box shown in FIG. 7. Specifically, the lifting space Q is a movable space in which the lifting plate 236 moves up and down. The lifting space Q is located on at least one side of the lifting plate 236, and an orthographic projection of the lifting space Q on the lifting plate 236 coincides with the lifting plate 236. In FIG. 7, the first connecting piece 232 and the second connecting piece 234 are in the unfolding position, and the lifting plate 236 reaches its highest position. Therefore, the lifting space Q is below the lifting plate 236.

Figure 11:
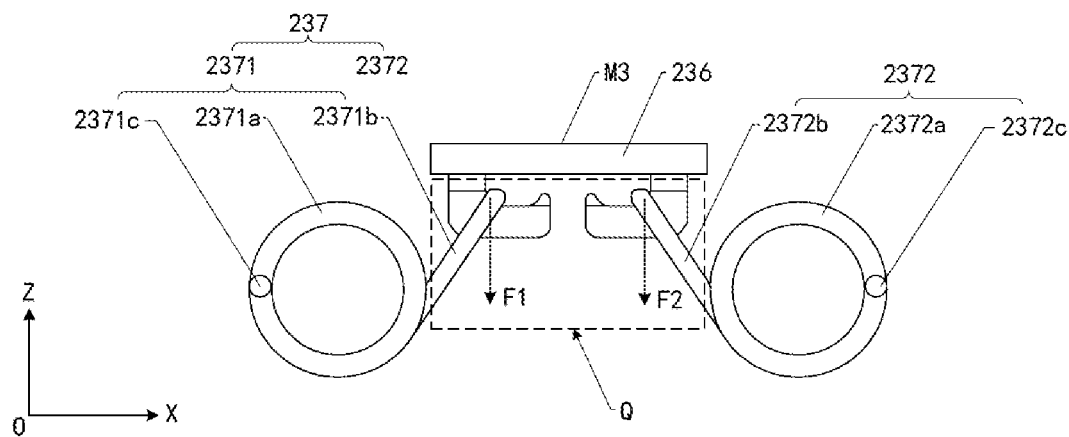
FIG. 11 is a schematic diagram of relative positions between a first force applying structure, a second force applying structure, and a lifting plate in the rotating mechanism shown in FIG. 7.

On this basis, refer to FIG. 11. FIG. 11 is a schematic diagram of relative positions between the force applying structure 237 and the lifting plate 236 in the rotating mechanism 23 shown in FIG. 7. The force applying structure 237 is located on at least one side in a circumference of the lifting space Q. The circumferential direction of the lifting space Q is a direction around a side surface of the lifting space Q. The side surface of the lifting space Q is a moving track surface around an edge of the lifting plate 236 during a process in which the lifting plate 236 moves up and down. The force applying structure 237 is connected to the lifting plate 236. The force applying structure 237 applies, to the lifting plate 236, a tensile force from the lifting plate 236 to a side of the lifting plate 236 away from the fitting surface M3. The tensile force is used to drive the lifting plate 236 to move down.

In the foregoing embodiment, the force applying structure 237 may be located on one side in the circumference of the lifting space Q, may be located on two opposite sides in the circumference of the lifting space Q, or may be directly located on three sides or four sides in the circumference of the lifting space Q. This is not specifically limited herein, provided that the force applying structure 237 is not located in a lifting path of the lifting plate 236. As a quantity of positions used to arrange the force applying structure 237 increase, a larger quantity of structures are included in the force applying structure 237, and structural complexity of the rotating mechanism 23 is higher. To avoid this problem, an example in which the force applying structure 237 is located on two opposite sides in the circumference of the lifting space Q is used for description in the following embodiments, but this should not be construed as a special limitation on this application.

Specifically, referring to FIG. 11, the force applying structure 237 includes a first force applying structure 2371 and a second force applying structure 2372. The first force applying structure 2371 and the second force applying structure 2372 are respectively located on two opposite sides in the circumference of the lifting space Q. The first force applying structure 2371 and the force applying structure 2372 each apply, to the lifting plate 236, a tensile force from the lifting plate 236 to a side of the lifting plate 236 away from the fitting surface M3. The tensile forces are F1 and F2 in FIG. 11. In this way, the forces applied to the lifting plate 236 are balanced. This can prevent the lifting plate 236 from inclining during the process in which the lifting plate 236 moves up and down. In addition, the force applying structure 237 includes fewer parts, helping reduce the structural complexity of the rotating mechanism 23.

It should be noted that, the first force applying structure 2371 and the second force applying structure 2372 are respectively located on two opposite sides in the circumference of the lifting space Q means that a principal part of the first force applying structure 2371 and a principal part of the second force applying structure 2372 are located on the two opposite sides in the circumference of the lifting space Q. The principal parts are parts with largest volumes in the first force applying structure 2371 and the second force applying structure 2372. On this basis, when a non-principal part of the first force applying structure 2371 and a non-principal part of the second force applying structure 2372 extend into the lifting space Q, it may also be considered that the first force applying structure 2371 and the second force applying structure 2372 are respectively located on the two opposite sides in the circumference of the lifting space Q.

For example, still referring to FIG. 11, both the first force applying structure 2371 and the second force applying structure 2372 are torsion springs. Specifically, the first force applying structure 2371 is a first torsion spring, and the second force applying structure 2372 is a second torsion spring. The first torsion spring and the second torsion spring are usually spring structures formed by winding materials such as carbon steel spring wires, piano wires, silicon manganese spring wires, chrome silicon spring wires, or chrome vanadium spring wires. The first torsion spring and the second torsion spring are mainly configured to bear torsional load. The first torsion spring includes a first spiral body 2371a, a first torsion arm 2371b, and a third torsion arm 2371c. The first torsion arm 2371b and the third torsion arm 2371c are connected to two opposite ends of the first spiral body 2371a. The first spiral body 2371a is the principal part of the first force applying structure 2371. The first torsion arm 2371b and the third torsion arm 2371c are non-principal parts of the first force applying structure 2371. The second torsion spring includes a second spiral body 2372a, a second torsion arm 2372b, and a fourth torsion arm 3272c. The second torsion arm 2372b and the fourth torsion arm 2372c are connected to two opposite ends of the second spiral body 2372a. The second spiral body 2372a is the principal part of the second force applying structure 2372. The second torsion arm 2372b and the fourth torsion arm 3272c are non-principal parts of the second force applying structure 2372. The first spiral body 2371a and the second spiral body 2372a are respectively located on two opposite sides in the circumference of the lifting space Q. The first torsion arm 2371b and the second torsion arm 2372b extend into the lifting space Q for connecting to the lifting plate 236. In this case, the first torsion arm 2371b of the first torsion spring and the second torsion arm 2372b of the second torsion spring extend into the lifting space Q, but the first torsion arm 2371b and the second torsion arm 2372b are non-principal parts. Therefore, it may also be considered that the first force applying structure 2371 and the second force applying structure 2372 are respectively located on the two opposite sides in the circumference of the lifting space Q.

It should be noted that, the first force applying structure 2371 and the second force applying structure 2372 may be the foregoing torsion springs, and may alternatively be other elastic structures such as spring pieces, plate springs, spiral springs, or rubber bands, so as to apply, to the lifting plate 236, an elastic tensile force from the lifting plate 236 to a side of the lifting plate 236 away from the fitting surface M3. In addition, the first force applying structure 2371 and the second force applying structure 2372 may alternatively be magnetic components including magnets and magnetic sheets, so as to apply, to the lifting plate 236, a magnetic attraction force from the lifting plate 236 to a side of the lifting plate 236 away from the fitting surface M3. If the first force applying structure 2371 and the second force applying structure 2372 are spring pieces, middle parts of the spring pieces are principal parts, and end parts thereof are non-principal parts. If the first force applying structure 2371 and the second force applying structure 2372 are plate springs, middle parts of the plate springs are principal parts, and end parts thereof are non-principal parts. If the first force applying structure 2371 and the second force applying structure 2372 are spiral springs, spiral parts of the spiral springs are principal parts, and end parts thereof are non-principal parts. If the first force applying structure 2371 and the second force applying structure 2372 are rubber bands, middle parts of the rubber bands are principal parts, and end parts thereof are non-principal parts. If the first force applying structure 2371 and the second force applying structure 2372 are magnetic components, structural parts (magnets or magnetic sheets) that are in the magnetic components and that are fastened to the lifting plate 236 are non-principal parts, and structural parts (magnetic sheets or magnets) that are in the magnetic components and that are fastened relative to the base 231 are principal parts.

FIG. 7 to FIG. 9 are described by merely using an example in which the first force applying structure 2371 and the second force applying structure 2372 are torsion arms, but this should not be construed as a special limitation on this application.

On this basis, specifically, primarily referring to FIG. 8 and FIG. 9, in the first force applying structure 2371, the first spiral body 2371a is sleeved on the first rotating shaft 23a.

Figure 12:
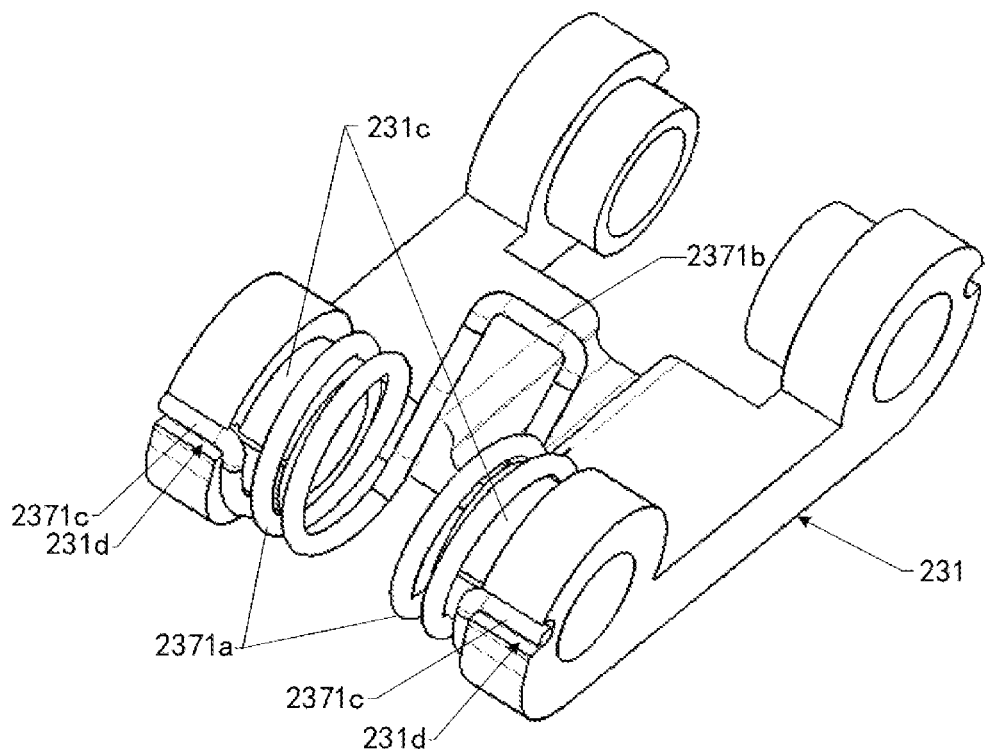
FIG. 12 is a diagram of assembly of a first force applying structure and a base in the rotating mechanism shown in FIG. 9.

In some embodiments, the first spiral body 2371a may be directly sleeved on the first rotating shaft 23a. In some other embodiments, refer to FIG. 12. FIG. 12 is a diagram of assembly of the first force applying structure 2371 and the base 231 in the rotating mechanism 23 shown in FIG. 9. In this embodiment, a shaft sleeve 231c is fastened to the base 231, and the shaft sleeve 231c is sleeved on the first rotating shaft 23a. It can be learned from the foregoing descriptions that, the first rotating shaft 23a is rotatably connected to the base 231, so that the first rotating shaft 23a can rotate in the shaft sleeve 231c. The first spiral body 2371a is sleeved on the shaft sleeve 231c. In this way, the first spiral body 2371a is indirectly sleeved on the first rotating shaft 23a by using the shaft sleeve 231c. There is a relatively large contact area between the shaft sleeve 231c and the first rotating shaft 23a, so that stuck caused by stress concentration can be avoided during relative rotation.

Referring to FIG. 8 and FIG. 9, the first torsion arm 2371b is located on a side of the lifting plate 236 away from the fitting surface M3. One end of the first torsion arm 2371b is fastened to one end of the first spiral body 2371a, and the other end of the first torsion arm 2371b is connected to the lifting plate 236. Specifically, the other end of the first torsion arm 2371b may be fixedly connected to the lifting plate 236, or may be slidably connected to the lifting plate 236 in a first direction (that is, an X-axis direction). In the following embodiments, texts and accompanying drawings are all described by using an example in which the other end of the first torsion arm 2371b is slidably connected to the lifting plate 236 in the first direction, but this should not be construed as a special limitation on this application.

Figure 13:
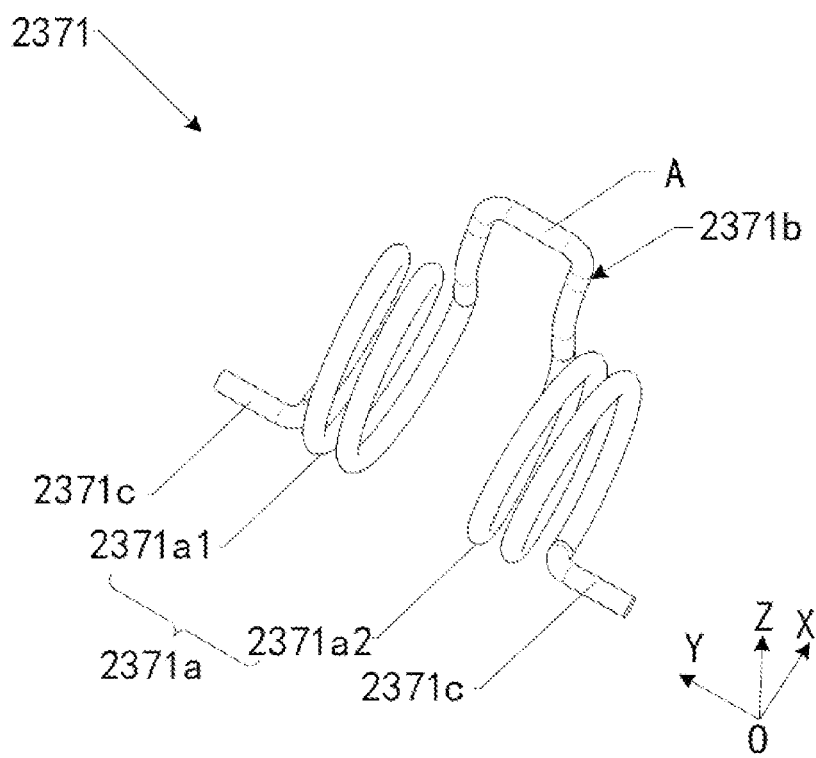
FIG. 13 is a schematic structural diagram of the first force applying structure in the rotating mechanism shown in FIG. 9.

To implement the slidable connection between the first torsion arm 2371b and the lifting plate 236, in some embodiments, refer to FIG. 13. FIG. 13 is a schematic structural diagram of the first force applying structure 2371 in the rotating mechanism 23 shown in FIG. 9. A mounting part A is provided on the first torsion arm 2371b of the first force applying structure 2371.

To form the mounting part A, in some embodiments, still referring to FIG. 13, the first spiral body 2371a includes a first spiral part 2371a1 and a second spiral part 2371a2. Both the first spiral part 2371a1 and the second spiral part 2371a2 are sleeved on the first rotating shaft 23a shown in FIG. 9. The first spiral part 2371a1 and the second spiral part 2371a2 are separated from each other in a Y-axis direction. One end of the first spiral part 2371a1 close to the second spiral part 2371a2 is a first end of the first spiral part 2371a1. One end of the second spiral part 2371a2 close to the first spiral part 2371a1 is a first end of the second spiral part 2371a2. The first torsion arm 2371b is n-shaped. Two ends of the first torsion arm 2371b are respectively fastened to the first end of first spiral part 2371a1 and the first end of the second spiral part 2371a2. A middle bent part of the first torsion arm 2371b forms the mounting part A.

Figure 14:
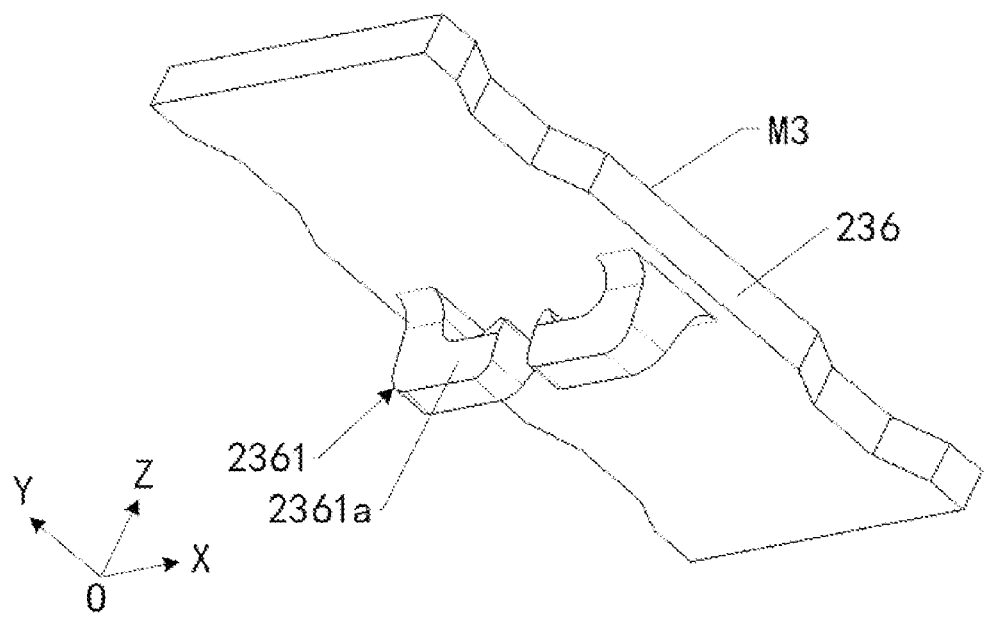
FIG. 14 is a schematic structural diagram of a lifting plate in the rotating mechanism shown in FIG. 9.

FIG. 14 is a schematic structural diagram of the lifting plate 236 in the rotating mechanism 23 shown in FIG. 9. A hook 2361 is provided on a surface of the lifting plate 236 away from the fitting surface M3. The hook 2361 is provided with a guiding section 2361a that extends in the X-axis direction.

Figure 15:
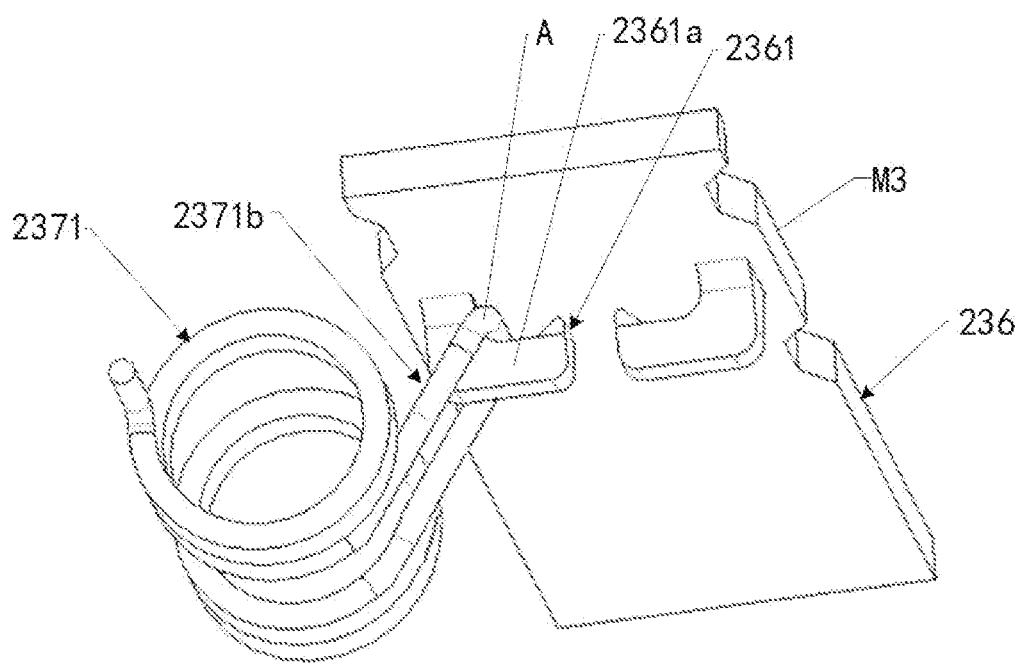
FIG. 15 is a diagram of assembly of the first force applying structure shown in FIG. 13 and the lifting plate shown in FIG. 14.

FIG. 15 is a diagram of assembly of the first force applying structure 2371 shown in FIG. 13 and the lifting plate 236 shown in FIG. 14. The first torsion arm 2371b is mounted to the hook 2361 by using the mounting part A, and can slide along the guiding section 2361a. In this way, the first torsion arm 2371b is slidably connected to the lifting plate 236. The structure is simple and easy to implement.

In other embodiments, the slidable connection between the first torsion arm 2371b and the lifting plate 236 may be a slidable connection implemented through cooperation between a sliding block and a sliding groove. This is not specifically limited herein.

On this basis, the first spiral body 2371a is fastened to the base 231 by using the third torsion arm 2371c. Specifically, the third torsion arm 2371c can be fastened to the base 231 in various manners. For example, the third torsion arm 2371c may be connected to the base 231 through welding. For another example, referring to FIG. 12, the base 231 is provided with a positioning groove 231d. The positioning groove 231d extends parallel to the first rotating shaft 23a, and the third torsion arm 2371c is embedded in the positioning groove 231d in a cooperated manner. This can prevent the first spiral body 2371a from rotating relative to the base 231, implementing that the first spiral body 2371a is fastened to the base 231. In this fastening manner, no complex welding operation is required, so that assembly efficiency of the rotating mechanism 23 can be improved.

In some embodiments, referring to FIG. 13, one end of the first spiral part 2371a1 away from the second spiral part 2371a2 is a second end of the first spiral part 2371a1. One end of the second spiral part 2371a2 away from the first spiral part 2371a1 is a second end of the second spiral part 2371a2. There are two third torsion arms 2371c, and the two third torsion arms 2371c are respectively fastened to the second end of first spiral part 2371a1 and the second end of the second spiral part 2371a2. The first spiral body 2371a is fastened to the base 231 by using the two third torsion arms 2371c. In this way, the first force applying structure 2371 is symmetrically designed, and the first spiral body 2371a can be fastened to the base 231 by using the two third torsion arms 2371c (referring to FIG. 12), ensuring that the first spiral body 2371a is stably fastened to the base 231.

It should be noted that, the third torsion arm 2371c not only may be fastened to the base 231, but also may be fastened to another structure fastened to the base 231. For example, the third torsion arm 2371c is fastened to a rotating shaft cover (not shown in the figure) or a support fastened to the base 231. This is not specifically limited herein. In addition, the first force applying structure 2371 may alternatively not include the third torsion arm 2371c. Instead, by using an end part of the first spiral body 2371a away from the first torsion arm 2371b, the first force applying structure 2371 is fastened to the base 231 or another structure fastened to the base 231. This is not specifically limited herein.

Similarly, referring back to FIG. 8 and FIG. 9, in the second force applying structure 2372, the second spiral body 2372a is sleeved on the second rotating shaft 23b, and the second rotating shaft 23b can rotate relative to the second spiral body 2372a. It can be understood that, for a specific manner in which the second spiral body 2372a is sleeved on the second rotating shaft 23b, refer to a specific manner in which the first spiral body 2371a is sleeved on the first rotating shaft 23a. Details are not described herein again.

The second torsion arm 2372b is located on a side of the lifting plate 236 away from the fitting surface M3. One end of the second torsion arm 2372b is fastened to one end of the second spiral body 2372a, and the other end of the second torsion arm 2372b is connected to the lifting plate 236. Specifically, the other end of the second torsion arm 2372b may be fixedly connected to the lifting plate 236, or may be slidably connected to the lifting plate 236 in the first direction (that is, the X-axis direction). In the following embodiments, texts and accompanying drawings are all described by using an example in which the other end of the second torsion arm 2372b is slidably connected to the lifting plate 236 in the first direction, but this should not be construed as a special limitation on this application.

For the slidable connection between the second torsion arm 2372b and the lifting plate 236, refer to the slidable connection between the first torsion arm 2371b and the lifting plate 236. Details are not described herein again. The other end of the second spiral body 2372a is fastened to the base 231. In some embodiments, the second force applying structure 2372 further includes a fourth torsion arm 3272c. The fourth torsion arm 3272c forms the other end of the second spiral body 3272a. The second spiral body 2372a is fastened to the base 231 by using the fourth torsion arm 3272c. For a specific manner of fastening the fourth torsion arm 3272c to the base 231, refer to the manner of fastening the third torsion arm 2371c to the base 231. Details are not described herein again.

It should also be noted that, the fourth torsion arm 3272c not only may be fastened to the base 231, but also may be fastened to another structure fastened to the base 231. For example, the fourth torsion arm 3272c is fastened to the rotating shaft cover (not shown in the figure) fastened to the base 231. This is not specifically limited herein. In addition, the second force applying structure 2372 may alternatively not include the fourth torsion arm 3272c. Instead, by using an end part of the second spiral body 2372a away from the second torsion arm 2372b, the second force applying structure 2372 is fastened to the base 231 or another structure fastened to the base 231. This is not specifically limited herein.

Referring back to FIG. 7, a supporting structure is configured to support the lifting plate 236, so as to apply, to the lifting plate 236 when the first connecting piece 232 and the second connecting piece 234 are in the unfolding position, supporting forces (for example, the supporting forces include F3 and F4) that counterbalance tensile forces (for example, the tensile forces include F1 and F2) from the force applying structure 2371. F1 in FIG. 7 is F1 in FIG. 11, and F2 in FIG. 7 is F2 in FIG. 11. In some embodiments, the supporting structure is fastened relative to the first connecting piece 232 or the second connecting piece 234. The supporting structure may include only a first supporting arm, and the first supporting arm is fastened relative to the first connecting piece 232 or the second connecting piece 234. The supporting structure may alternatively include both the first supporting arm and a second supporting arm, and the first supporting arm and the second supporting arm are respectively fastened relative to the first connecting piece 232 and the second connecting piece 234. The following provides descriptions by only using an example in which the supporting structure includes both the first supporting arm and the second supporting arm and the first supporting arm and the second supporting arm are respectively fastened relative to the first connecting piece 232 and the second connecting piece 234, but this should not be construed as a special limitation on this application.

On this basis, specifically, referring back to FIG. 7, the supporting structure includes the first supporting arm 233 and the second supporting arm 235. The first supporting arm 233 and the second supporting arm 235 may be located on a side of the lifting plate 236 away from the fitting surface M3. The first supporting arm 233 is fastened relative to the first connecting piece 232. Specifically, the first supporting arm 233 may be directly fastened to the first connecting piece 232, or may be fastened to the first rotating shaft 23a fastened to the first connecting piece 232. This application provides descriptions by only using an example in which the first supporting arm 233 is fastened to the first rotating shaft 23a fastened to the first connecting piece 232, but this should not be construed as a special limitation on this application. Similarly, the second supporting arm 235 is fastened relative to the second connecting piece 234. Specifically, the second supporting arm 235 may be directly fastened to the second connecting piece 234, or may be fastened to the second rotating shaft 23b fastened to the second connecting piece 234. This application provides descriptions by only using an example in which the second supporting arm 235 is fastened to the second rotating shaft 23b fastened to the second connecting piece 234, but this should not be construed as a special limitation on this application.

In the foregoing embodiment, to fasten the first supporting arm 233 to the first rotating shaft 23a, for example, the first supporting arm 233 may be fastened to the first rotating shaft 23a through welding. For another example, referring to FIG. 9, a first flat position 23a1 is provided on a side surface of the first rotating shaft 23a. There may be one or more first flat positions 23a1. In some embodiments, referring to FIG. 9, there are two first flat positions 23a1, and the two first flat positions 23a1 are respectively provided at two ends of the first rotating shaft 23a in a radial direction. In other embodiments, there may be one first flat positions 23a1. The first supporting arm 233 is provided with a flat hole 233a, and the first supporting arm 233 passes through the first rotating shaft 23a through the flat hole 233a in a coordinated manner. In this way, the first supporting arm 233 is prevented from rotating around the first rotating shaft 23a, so that the first supporting arm 233 is fastened relative to the first rotating shaft 23a. In this fastening manner, relatively high stability of the connection between the first supporting arm 233 and the first rotating shaft 23a is achieved. In addition, it is convenient for installation, assembly difficulty of the rotating mechanism 23 can be reduced, and assembly efficiency of the rotating mechanism 23 can be improved.

For a specific manner of fastening the second supporting arm 235 to the second rotating shaft 23b, refer to the manner of fastening the first supporting arm 233 to the first rotating shaft 23a. Details are not described herein again.

Figure 16:
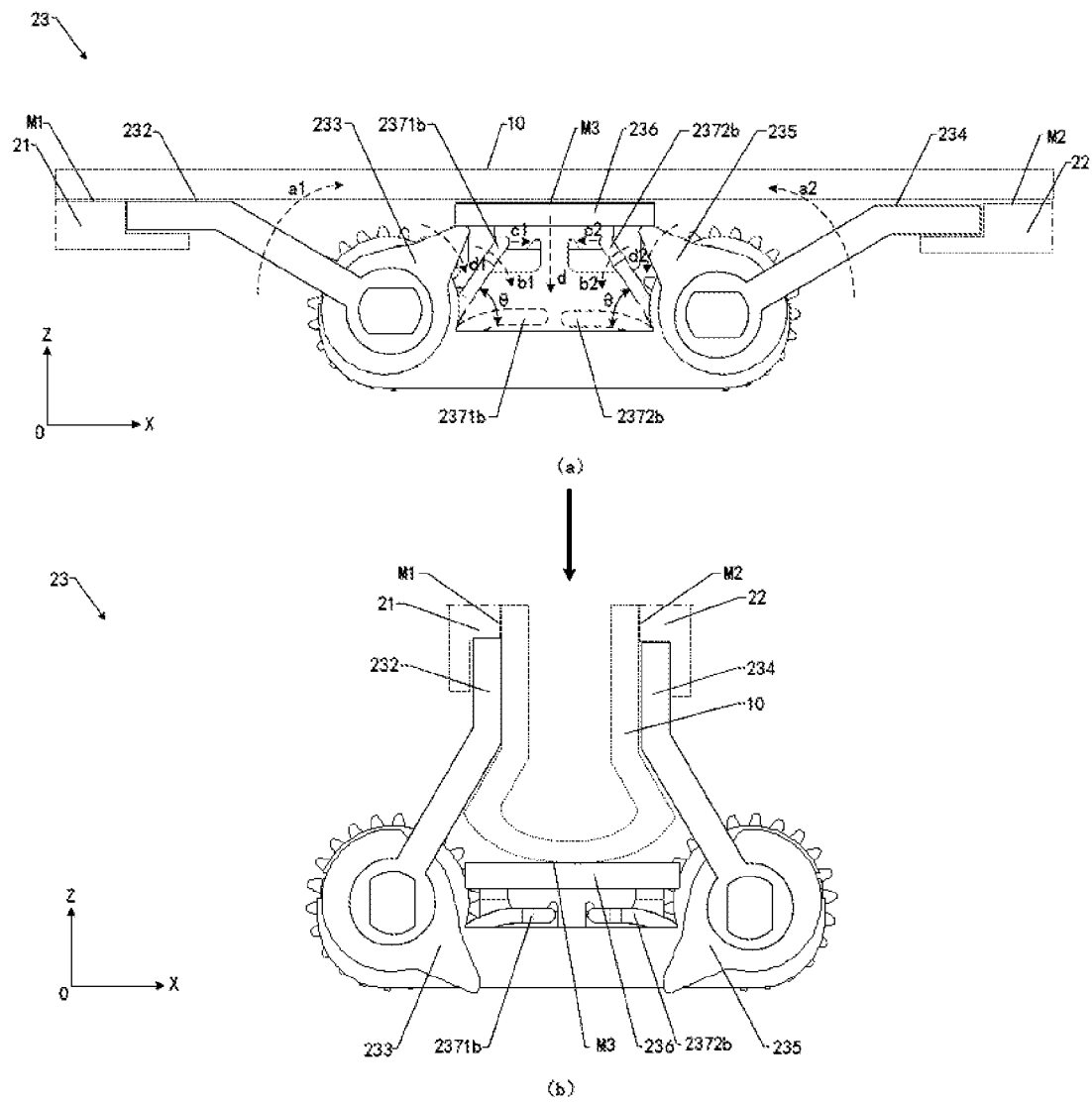
FIG. 16 is a schematic structural diagram of the rotating mechanism shown in FIG. 7 when the first connecting piece and the second connecting piece rotate from the unfolding position to a folding position, where (a) in FIG. 16 is a schematic structural diagram of the rotating mechanism when the first connecting piece and the second connecting piece are in the unfolding position, and (b) in FIG. 16 is a schematic structural diagram of the rotating mechanism when the first connecting piece and the second connecting piece are in the folding position.

FIG. 16 is a schematic structural diagram of the rotating mechanism 23 shown in FIG. 7 when the first connecting piece 232 and the second connecting piece 234 rotate from the unfolding position to the folding position. The (a) in FIG. 16 is a schematic structural diagram of the rotating mechanism 23 when the first connecting piece 232 and the second connecting piece 234 are in the unfolding position. In this position, the first torsion arm 2371b and the second torsion arm 2372b of the force applying structure 237 are in a deformed state of swinging towards the fitting surface M3, so that the force applying structure 237 applies, to the lifting plate 236, a tensile force from the lifting plate 236 to a side of the lifting plate 236 away from the fitting surface M3. For example, the tensile force includes F1 and F2 shown in FIG. 7. The lifting plate 236 is supported by the supporting structure (for example, the supporting structure includes the first supporting arm 233 and the second supporting arm 235). The supporting structure applies a first supporting force to the lifting plate 236. For example, the first supporting force includes F3 and F4 shown in FIG. 7. The first supporting force counterbalances the tensile force, so that the rotating mechanism 23 can keep in an unfolded state. Still referring to (a) in FIG. 16, positions of the first torsion arm 2371b and the second torsion arm 2372b shown by dashed lines are positions of the first torsion arm 2371b and the second torsion arm 2372b in a free state (that is, a state in which no force is applied). Positions of the first torsion arm 2371b and the second torsion arm 2372b shown by solid lines are positions of the first torsion arm 2371b and the second torsion arm 2372b when the first connecting piece 232 and the second connecting piece 234 are in the unfolding position. Relative to the positions shown by the dashed lines, the positions shown by the solid lines swing by a specific angle θ towards the fitting surface M3. In other words, the first torsion arm 2371b and the second torsion arm 2372b are in a deformed state of swinging towards the fitting surface M3. The swing-deformation angle is θ. In some embodiments, θ is greater than 0° and equal to or less than 85°. Optionally, the swing-deformation angle is 45°. This facilitates control of a falling height of the lifting plate 236.

When the first connecting piece 232 and the second connecting piece 234 respectively rotate to the folding position in a direction a1 and a direction a2, the first supporting arm 233 and the second supporting arm 235 respectively rotate in a direction d1 and a direction d2 away from the fitting surface M3, so as to withdraw the first supporting force. In this way, under actions of their own elastic forces, the first torsion arm 2371b and the second torsion arm 2372b respectively swing in a direction b1 and a direction b2 away from the fitting surface M3. During swinging, in a direction c1 and a direction c2, the first torsion arm 2371b and the second torsion arm 2372b respectively slide relative to the lifting plate 236. In this way, the lifting plate 236 can be driven to move down in a direction d.

When swinging angles of the first torsion arm 2371b and the second torsion arm 2372b are 0, the lifting plate 236 moves down to a lowest position. Afterwards, when the first connecting piece 232 and the second connecting piece 234 continue rotating, the lifting plate 236 does not continue moving down, and only the first supporting arm 233 and the second supporting arm 235 respectively continue rotating along with the first connecting piece 232 and the second connecting piece 234. (a) in FIG. 16 is a schematic structural diagram of the rotating mechanism 23 when the first connecting piece 232 and the second connecting piece 234 are in the folding position. In this position, a water drop-shaped flexible display 10 can be formed to improve reliability and service life of the flexible display 10.

Contrary to the foregoing process, when the first connecting piece 232 and the second connecting piece 234 rotate from the folding position to the unfolding position, the first supporting arm 233 and the second supporting arm 235 respectively rotate in directions opposite to the direction d1 and the direction d2, that is, rotate to a side of the lifting plate 236 close to the fitting surface M3. During a swinging process after the first supporting arm 233 and the second supporting arm 235 are in contact with the lifting plate 236, the first supporting arm 233 and the second supporting arm 235 apply a second supporting force to the lifting plate 236. The second supporting force can overcome the tensile force from the force applying structure 237 to push the lifting plate 236 to move up, till the fitting surface M3 of the lifting plate 236 is level with the fitting surface M1 and the fitting surface M2. In this way, the flexible display 10 supported by them is leveled off. In addition, the first torsion arm 2371b and the second torsion arm 2372b swing towards the fitting surface M3 to cause deformation and accumulate elastic force, to prepare for a next falling process of the lifting plate 236.

In the rotating mechanism 23 provided in the embodiments of this application, the force applying structure 237 cooperates with the supporting structure to drive the lifting plate 236 to move up and down. In addition, the force applying structure 237 is provided on at least one side in the circumference of the lifting space Q, preventing the force applying structure 237 from entering the lifting space of the lifting plate 236. In this way, on one hand, the force applying structure 237 does not affect a lifting stroke of the lifting plate 236 when the supporting apparatus 20 has a specific thickness in an unfolded state. This can greatly increase the lifting stroke of the lifting plate 236. On the other hand, the supporting apparatus 20 has a relatively small thickness in the unfolded state when there is a specific lifting stroke of the lifting plate 236. This is favorable for thin design of an electronic device 100 in the unfolded state. In other words, in the rotating mechanism 23 provided in the embodiments of this application, both the lifting stroke of the lifting plate and a thickness of the electronic device in the unfolded state can be taken into consideration.

Based on the foregoing technical effects, further, both the first force applying structure 2371 and the second force applying structure 2372 are torsion springs, the principal part (that is, the first spiral body 2371a) of the first force applying structure 2371 is sleeved on the first rotating shaft 23a, and the principal part (that is, the second spiral body 2372a) of the second force applying structure 2372 is sleeved on the second rotating shaft 23b. Therefore, in this embodiment, the first force applying structure 2371 and the second force applying structure 2372 are respectively installed in peripheral spaces of the first rotating shaft 23a and the second rotating shaft 23b. In this way, there is no need to additionally provide a special space for installing the force applying structure 237. This can further reduce the thickness of the supporting apparatus 20 and increase the lifting stroke of the lifting plate 236.

Figure 17:
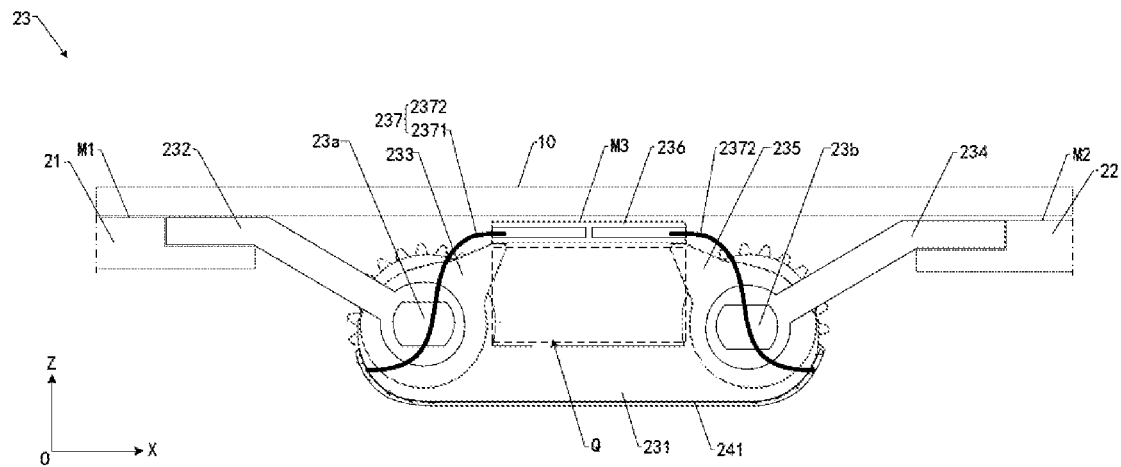
FIG. 17 is a main view of a rotating mechanism when a first connecting piece and a second connecting piece are in an unfolding position according to some other embodiments of this application.
Figure 18:
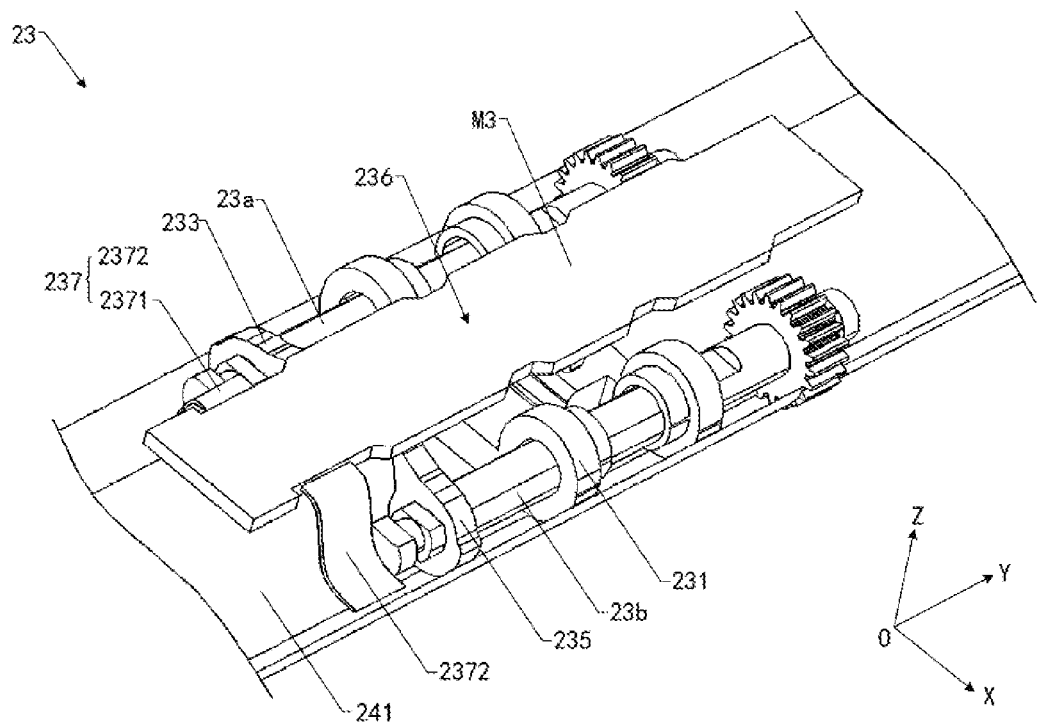
FIG. 18 is a stereogram of the rotating mechanism shown in FIG. 17.

FIG. 17 is a main view of a rotating mechanism 23 when a first connecting piece 232 and a second connecting piece 234 are in an unfolding position according to some other embodiments of this application. FIG. 18 is a stereogram of the rotating mechanism 23 shown in FIG. 17. The first connecting piece 232 and the second connecting piece 234 are not shown in FIG. 18. A difference between the rotating mechanism 23 in this embodiment and the rotating mechanism 23 shown in FIG. 7 to FIG. 9 is that: In this embodiment, the first force applying structure 2371 and the second force applying structure 2372 are spring pieces. Specifically, a first force applying structure 2371 is a first spring piece, and a second force applying structure 2372 is a second spring piece. The first spring piece and the second spring piece each may be a flat phosphor bronze steel belt, a flat tin bronze steel belt, or a flat steel belt with a grade of 65 mn, 55Si2 Mn, 60Si2MnA, 55SiMnVB, 55SiMnMoV, 60CrMn, 60CrMnB, 302, 316, or the like.

On this basis, one end of the first spring piece and one end of the second spring piece are fastened relative to a base 231. Specifically, the one end of the first spring piece and the one end of the second spring piece may be directly fastened to the base 231, or may be fastened to another structure (for example, a rotating shaft cover and a support) fastened to the base 231. In the embodiment shown in FIG. 17 and FIG. 18, the one end of the first spring piece and the one end of the second spring piece are fastened to a rotating shaft cover 241. The rotating shaft cover 241 is configured to shield and protect rotating shafts (including a first rotating shaft 23a and a second rotating shaft 23b), so as to prevent other objects near an electronic device 100 from interfering with rotation of the rotating shafts. The rotating shaft cover 241 is fastened to the base 231 by using structures such as screws or rivets. The other end of the first spring piece and the other end of the second spring piece are connected to a lifting plate 236. Specifically, the other end of the first spring piece and the other end of the second spring piece may be fixedly connected to the lifting plate 236, or may be slidably connected to the lifting plate 236.

If the other end of the first spring piece and the other end of the second spring piece are fixedly connected to the lifting plate 236, bent sections may be provided on the first spring piece and the second spring piece to ensure elasticity of the first force applying structure 2371 and the second force applying structure 2372.

If the other end of the first spring piece and the other end of the second spring piece are slidably connected to the lifting plate 236, the first spring piece and the second spring piece may be designed into flat sheet structures to reduce a space occupied by the first force applying structure 2371 and the second force applying structure 2372 in the electronic device.

On this basis, for the slidable connection between the first spring piece and the lifting plate 236, refer to FIG. 17. Specifically, a guiding chute is provided in a side wall of the lifting plate 236, and the other end of the first spring piece extends into the guiding chute, and can slide along the guiding chute. In this way, on one hand, no part of the first spring piece extends into a lifting space Q, so that a lifting stroke of the lifting plate 236 can be maximized, and a thickness of the electronic device in an unfolded state can be reduced. On the other hand, a part of the first spring piece can be accommodated and hidden in the guiding chute, reducing an exposed part of the first spring piece and reducing a space occupied by the first spring piece in the rotating mechanism 23. It can be understood that, the slidable connection between the second spring piece and the lifting plate 236 can also be implemented in this manner. Details are not described herein again. In some other embodiments, the slidable connection between the first spring piece and the lifting plate 236 and the slidable connection between the second spring piece and the lifting plate 236 may alternatively be a slidable connection implemented by a sliding block and a sliding rod. This is not specifically limited herein.

Figure 19:
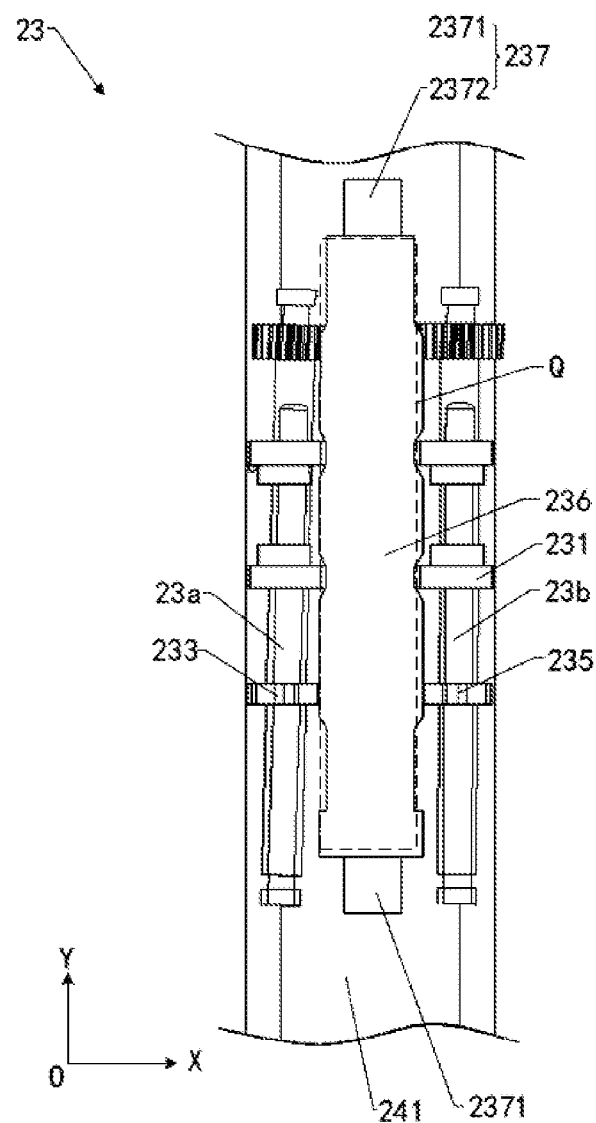
FIG. 19 is a top view of a rotating mechanism when a first connecting piece and a second connecting piece are in an unfolding position according to some other embodiments of this application.

In this embodiment, the first spring piece and the second spring piece may be provided on any two opposite sides in a circumference of the lifting space Q. This is not specifically limited herein. For example, referring to FIG. 17, the first spring piece and the second spring piece are provided on two opposite sides of the lifting space Q in an X-axis direction. For another example, refer to FIG. 19. FIG. 19 is a top view of a rotating mechanism 23 when a first connecting piece 232 and a second connecting piece 234 are in an unfolding position according to some other embodiments of this application. In this embodiment, the first connecting piece 232 and the second connecting piece 234 are not shown. A first spring piece and a second spring piece are provided on two opposite sides of a lifting space Q in a Y-axis direction.

Figure 20:
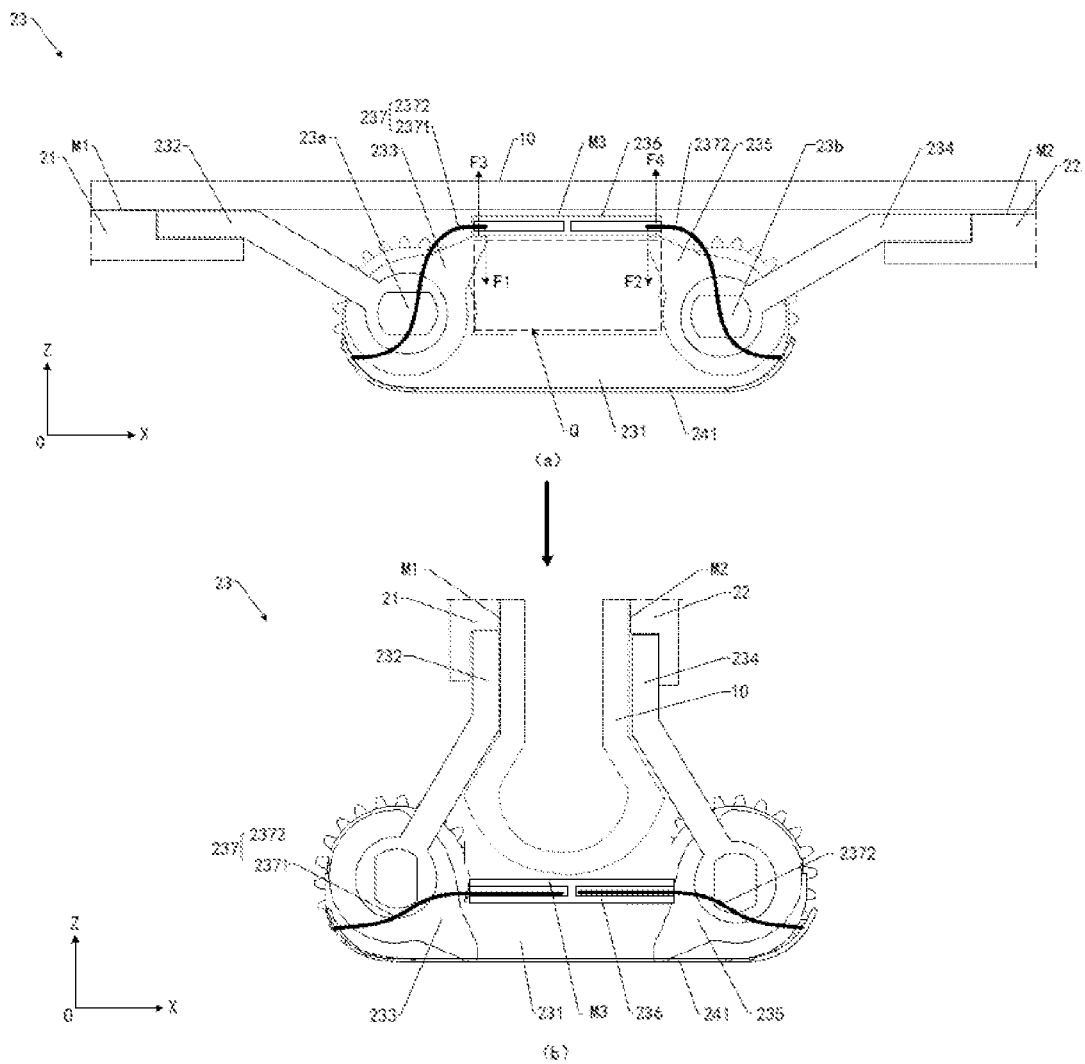
FIG. 20 is a schematic structural diagram of the rotating mechanism shown in FIG. 17 when the first connecting piece and the second connecting piece rotate from the unfolding position to a folding position, where (a) in FIG. 20 is a schematic structural diagram of the rotating mechanism when the first connecting piece and the second connecting piece are in the unfolding position, and (b) in FIG. 20 is a schematic structural diagram of the rotating mechanism when the first connecting piece and the second connecting piece are in the folding position.

FIG. 20 is a schematic structural diagram of the rotating mechanism 23 shown in FIG. 17 when the first connecting piece 232 and the second connecting piece 234 rotate from the unfolding position to a folding position. (a) in FIG. 20 is a schematic structural diagram of the rotating mechanism 23 when the first connecting piece 232 and the second connecting piece 234 are in the unfolding position. In this position, the first spring piece and the second spring piece are in a deformed state of bending towards a fitting surface M3, so that a force applying structure 237 applies, to the lifting plate 236, elastic tensile forces F1 and F2 from the lifting plate 236 to a side of the lifting plate 236 away from the fitting surface M3. On this basis, the lifting plate 236 is supported by a supporting structure (for example, the supporting structure includes a first supporting arm 233 and a second supporting arm 235). The supporting structure applies supporting forces F3 and F4 to the lifting plate 236. The supporting forces counterbalance the elastic tensile forces, so that the rotating mechanism 23 can keep in an unfolded state.

When both the first connecting piece 232 and the second connecting piece 234 rotate to the folding position, both the first supporting arm 233 and the second supporting arm 235 swing away from the fitting surface M3. In this case, the lifting plate 236 loses the supporting forces, and the first spring piece and the second spring piece are reset to move away from the fitting surface M3 under actions of their own elastic forces. During resetting, end parts of the first spring piece and the second spring piece slide inside the guiding chute of the lifting plate 236. In this way, the lifting plate 236 can be driven to move down. (a) in FIG. 20 is a schematic structural diagram of the rotating mechanism 23 when the first connecting piece 232 and the second connecting piece 234 are in the folding position. In this position, a water drop-shaped flexible display 10 can be formed to improve reliability and service life of the flexible display 10. Contrary to the process, the first connecting piece 232 and the second connecting piece 234 may rotate from the folding position to the unfolding position.

In the rotating mechanism 23 provided in the embodiments of this application, no parts of the first force applying structure 2371 and the second force applying structure 2372 extend into the lifting space Q, so that the lifting stroke of the lifting plate 236 can be maximized, and the thickness of the electronic device in the unfolded state can be reduced. In addition, the first force applying structure 2371 and the second force applying structure 2372 occupy a relatively small space and have relatively small thicknesses. This can further reduce the thickness of the electronic device in the unfolded state.

Figure 21:
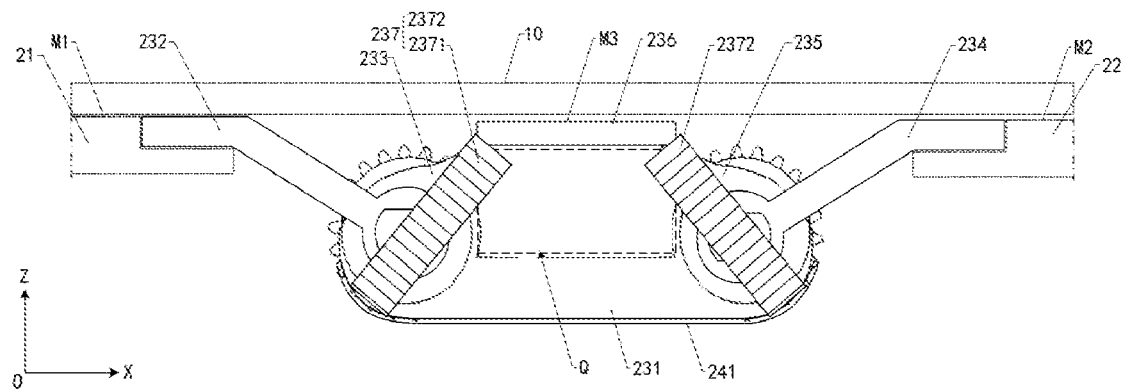
FIG. 21 is a main view of a rotating mechanism when a first connecting piece and a second connecting piece are in an unfolding position according to some other embodiments of this application.
Figure 22:
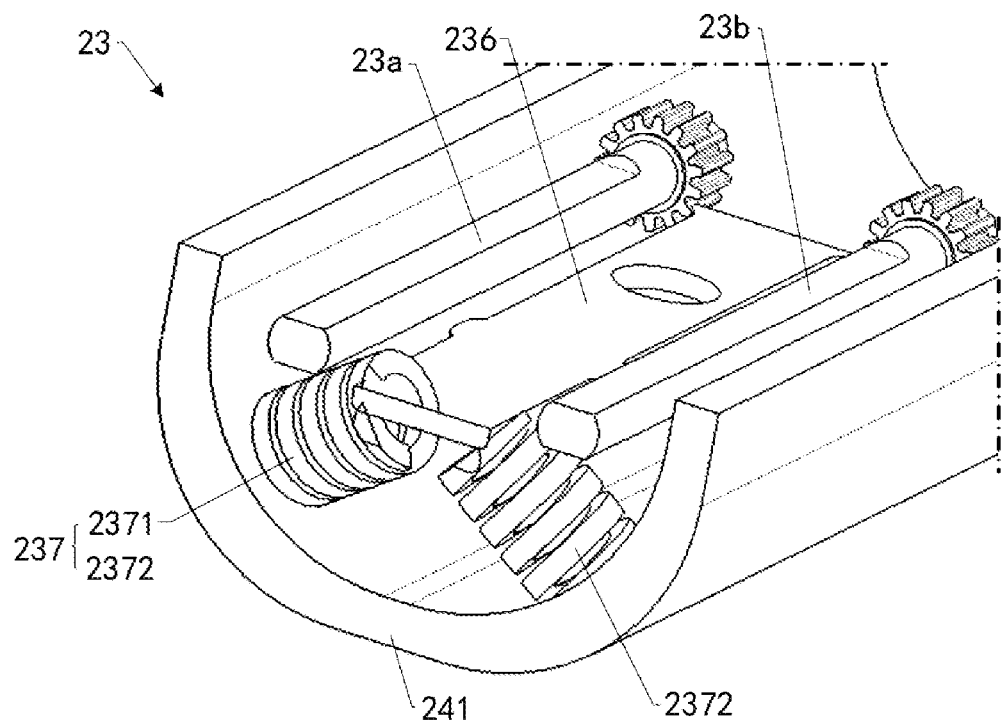
FIG. 22 is a schematic three-dimensional structure diagram of some structures in the rotating mechanism shown in FIG. 21.

FIG. 21 is a main view of a rotating mechanism 23 when a first connecting piece 232 and a second connecting piece 234 are in an unfolding position according to some other embodiments of this application. FIG. 22 is a schematic three-dimensional structure diagram of some structures in the rotating mechanism 23 shown in FIG. 21. A base 231, the first connecting piece 232, the second connecting piece 234, a first supporting arm 233, and a second supporting arm 235 are not shown in FIG. 22. A difference between the rotating mechanism 23 in this embodiment and the rotating mechanism 23 shown in FIG. 7 to FIG. 9 is that: In this embodiment, a first force applying structure 2371 and a second force applying structure 2372 are spiral telescopic springs. Specifically, the first force applying structure 2371 is a first spiral telescopic spring, and the second force applying structure 2372 is a second spiral telescopic spring. In some embodiments, the first spiral telescopic spring and the second spiral telescopic spring are spiral extension springs. An extension spring is mainly used to withstand a tensile force and has relatively high reliability.

On this basis, one end of the first spiral telescopic spring and one end of the second spiral telescopic spring in their stretching directions are connected to the base 231. Specifically, the one end of the first spiral telescopic spring and the one end of the second spiral telescopic spring may be fixedly connected to the base 231, or may be mounted to the base 231. In addition, the one end of the first spiral telescopic spring and the one end of the second spiral telescopic spring may be directly connected to the base 231, or may be connected to another structure (for example, a rotating shaft cover and a support) fastened to the base 231. In the embodiment shown in FIG. 21, the one end of the first spiral telescopic spring and the one end of the second spiral telescopic spring are connected to a rotating shaft cover 241. The rotating shaft cover 241 is fastened to the base 231 by using structures such as screws or rivets. Specifically, the one end of the first spiral telescopic spring and the one end of the second spiral telescopic spring are fixedly connected to the rotating shaft cover 241. The other end of the first spiral telescopic spring and the other end of the second spiral telescopic spring in their stretching directions are connected to the lifting plate 236. Specifically, the other end of the first spiral telescopic spring and the other end of the second spiral telescopic spring may be fixedly connected to the lifting plate 236, may be mounted to the lifting plate 236, or may be slidably connected to the lifting plate 236. This is not specifically limited herein.

In this embodiment, the first spiral telescopic spring and the second spiral telescopic spring may be provided on any two opposite sides in a circumference of a lifting space Q. This is not specifically limited herein. For example, referring to FIG. 21, the first spiral telescopic spring and the second spiral telescopic spring may be provided on two opposite sides of the lifting space Q in an X-axis direction. In some other embodiments, the first spiral telescopic spring and the second spiral telescopic spring may alternatively be provided on two opposite sides of the lifting space Q in a Y-axis direction.

Figure 23:
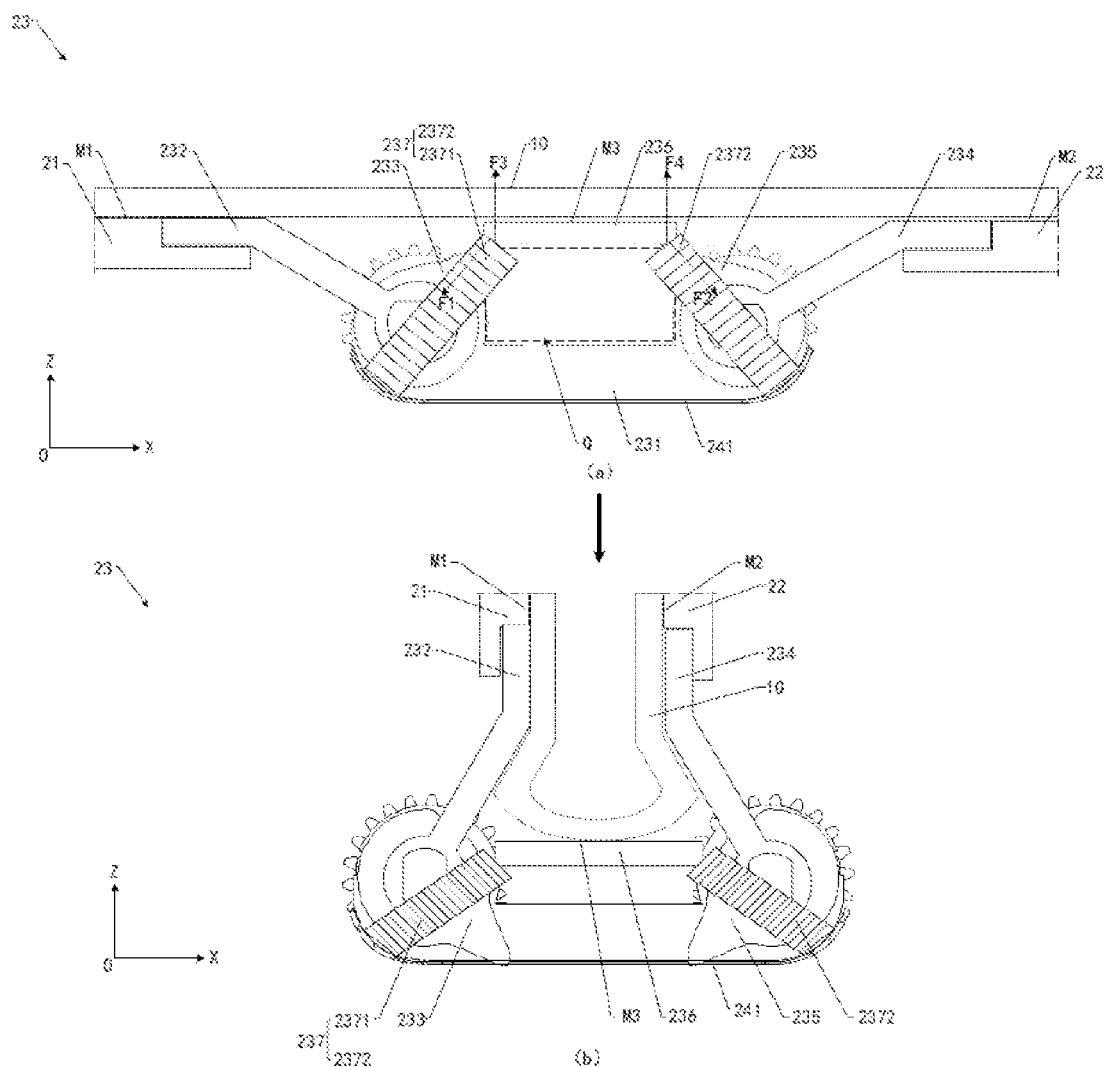
FIG. 23 is a schematic structural diagram of the rotating mechanism shown in FIG. 21 when the first connecting piece and the second connecting piece rotate from the unfolding position to a folding position, where (a) in FIG. 23 is a schematic structural diagram of the rotating mechanism when the first connecting piece and the second connecting piece are in the unfolding position, and (b) in FIG. 23 is a schematic structural diagram of the rotating mechanism when the first connecting piece and the second connecting piece are in the folding position.

FIG. 23 is a schematic structural diagram of the rotating mechanism 23 shown in FIG. 21 when the first connecting piece 232 and the second connecting piece 234 rotate from the unfolding position to a folding position. (a) in FIG. 23 is a schematic structural diagram of the rotating mechanism 23 when the first connecting piece 232 and the second connecting piece 234 are in the unfolding position. In this position, the first spiral telescopic spring and the second spiral telescopic spring are in an elongated and deformed state, so that a force applying structure 237 applies, to the lifting plate 236, elastic tensile forces F1 and F2 from the lifting plate 236 to a side of the lifting plate 236 away from a fitting surface M3. On this basis, the lifting plate 236 is supported by a supporting structure (for example, the supporting structure includes the first supporting arm 233 and the second supporting arm 235). The supporting structure applies supporting forces F3 and F4 to the lifting plate 236. The supporting forces counterbalance the elastic tensile forces, so that the rotating mechanism 23 can keep in an unfolded state.

When both the first connecting piece 232 and the second connecting piece 234 rotate to the folding position, both the first supporting arm 233 and the second supporting arm 235 swing away from the fitting surface M3. In this case, the lifting plate 236 loses the supporting forces, and the first spiral telescopic spring and the second spiral telescopic spring contract to move away from the fitting surface M3 under actions of their own elastic forces. In this way, the lifting plate 236 can be driven to move down. (a) in FIG. 23 is a schematic structural diagram of the rotating mechanism 23 when the first connecting piece 232 and the second connecting piece 234 are in the folding position. In this position, a water drop-shaped flexible display 10 can be formed to improve reliability and service life of the flexible display 10. Contrary to the process, the first connecting piece 232 and the second connecting piece 234 may rotate from the folding position to the unfolding position.

In the rotating mechanism 23 provided in the embodiments of this application, the first force applying structure 2371 and the second force applying structure 2372 have simple structures and relatively low costs, and are easy to implement.

Figure 24:
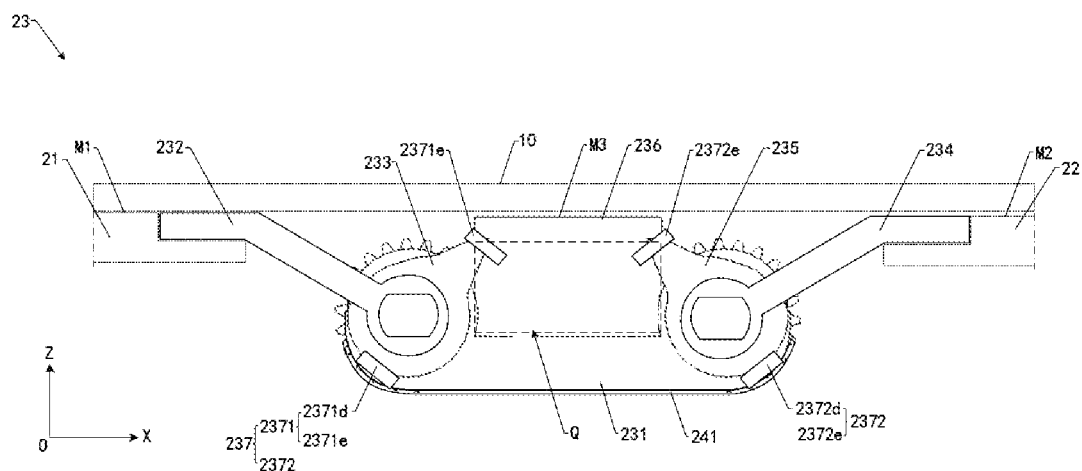
FIG. 24 is a main view of a rotating mechanism when a first connecting piece and a second connecting piece are in an unfolding position according to some other embodiments of this application.

FIG. 24 is a main view of a rotating mechanism 23 when a first connecting piece 232 and a second connecting piece 234 are in an unfolding position according to some other embodiments of this application. A difference between the rotating mechanism 23 in this embodiment and the rotating mechanism 23 shown in FIG. 7 to FIG. 9 is that: In this embodiment, a first force applying structure 2371 includes a first magnet 2371d and a first magnetic sheet 2371e. A second force applying structure 2372 includes a second magnet 2372d and a second magnetic sheet 2372e.

One of the first magnet 2371d and the first magnetic sheet 2371e is fastened relative to a base 231. Specifically, the one of the first magnet 2371d and the first magnetic sheet 2371e may be directly fastened to the base 231, or may be fastened to another structure (for example, a rotating shaft cover and a support) fastened to the base 231. In the embodiment shown in FIG. 24, the one of the first magnet 2371d and the first magnetic sheet 2371e is fastened to a rotating shaft cover 241. The rotating shaft cover 241 is fastened to the base 231 by using structures such as screws or rivets. The other of the first magnet 2371d and the first magnetic sheet 2371e is fastened relative to a lifting plate 236. Specifically, the other of the first magnet 2371d and the first magnetic sheet 2371e may be directly fastened to the lifting plate 236, or may be fastened to another structure fastened to the lifting plate 236. In the embodiment shown in FIG. 24, the other of the first magnet 2371d and the first magnetic sheet 2371e is directly fastened to the lifting plate 236.

One of the second magnet 2372d and the second magnetic sheet 2372e is fastened relative to the base 231. Specifically, the one of the second magnet 2372d and the second magnetic sheet 2372e may be directly fastened to the base 231, or may be fastened to another structure (for example, a rotating shaft cover and a support) fastened to the base 231. In the embodiment shown in FIG. 24, the one of the second magnet 2372d and the second magnetic sheet 2372e is fastened to the rotating shaft cover 241. The rotating shaft cover 241 is fastened to the base 231 by using structures such as screws or rivets. The other of the second magnet 2372d and the second magnetic sheet 2372e is fastened relative to the lifting plate 236. Specifically, the other of the second magnet 2372d and the second magnetic sheet 2372e may be directly fastened to the lifting plate 236, or may be fastened to another structure fastened to the lifting plate 236. In the embodiment shown in FIG. 24, the other of the second magnet 2372d and the second magnetic sheet 2372e is directly fastened to the lifting plate 236.

In this embodiment, the first force applying structure 2371 and the second force applying structure 2372 may be provided on any two opposite sides in a circumference of a lifting space Q. This is not specifically limited herein. For example, referring to FIG. 24, the first force applying structure 2371 and the second force applying structure 2372 may be provided on two opposite sides of the lifting space Q in an X-axis direction. In some other embodiments, the first force applying structure 2371 and the second force applying structure 2372 may alternatively be provided on two opposite sides of the lifting space Q in a Y-axis direction.

Figure 25:
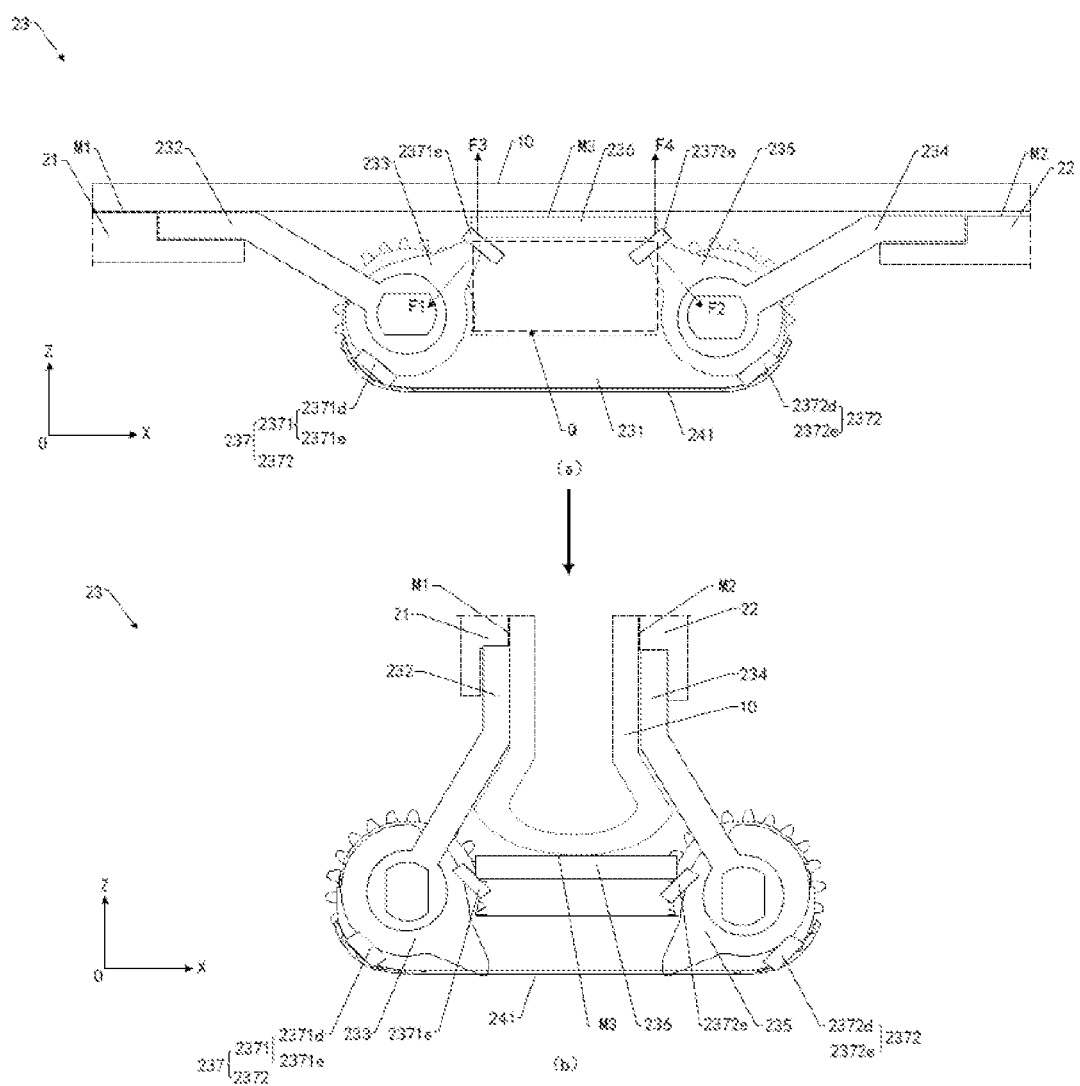
FIG. 25 is a schematic structural diagram of the rotating mechanism shown in FIG. 24 when the first connecting piece and the second connecting piece rotate from the unfolding position to a folding position, where (a) in FIG. 25 is a schematic structural diagram of the rotating mechanism when the first connecting piece and the second connecting piece are in the unfolding position, and (b) in FIG. 25 is a schematic structural diagram of the rotating mechanism when the first connecting piece and the second connecting piece are in the folding position.

FIG. 25 is a schematic structural diagram of the rotating mechanism 25 shown in FIG. 24 when the first connecting piece 232 and the second connecting piece 234 rotate from the unfolding position to a folding position. (a) in FIG. 25 is a schematic structural diagram of the rotating mechanism 23 when the first connecting piece 232 and the second connecting piece 234 are in the unfolding position. In this position, the first magnet 2371d and the first magnetic sheet 2371e are separated from each other and there is a magnetic attraction therebetween, and the second magnet 2372d and the second magnetic sheet 2372e are separated from each other and there is a magnetic attraction therebetween, so that a force applying structure 237 applies, to the lifting plate 236, magnetic attraction forces F1 and F2 from the lifting plate 236 to a side of the lifting plate 236 away from a fitting surface M3. On this basis, the lifting plate 236 is supported by a supporting structure (for example, the supporting structure includes the first supporting arm 233 and the second supporting arm 235). The supporting structure applies supporting forces F3 and F4 to the lifting plate 236. The supporting forces counterbalance the magnetic attraction forces, so that the rotating mechanism 23 can keep in an unfolded state.

When both the first connecting piece 232 and the second connecting piece 234 rotate to the folding position, both the first supporting arm 233 and the second supporting arm 235 swing away from the fitting surface M3. In this case, the lifting plate 236 loses the supporting forces, and the first magnetic sheet 2371e and the second magnetic sheet 2371e respectively move in directions towards the first magnet 2371d and the second magnet 2372d under an action of the magnetic attraction forces. In this way, the lifting plate 236 can be driven to move down. (a) in FIG. 25 is a schematic structural diagram of the rotating mechanism 23 when the first connecting piece 232 and the second connecting piece 234 are in the folding position. In this position, a water drop-shaped flexible display 10 can be formed to improve reliability and service life of the flexible display 10. Contrary to the process, the first connecting piece 232 and the second connecting piece 234 may rotate from the folding position to the unfolding position. In the rotating mechanism 23 provided in the embodiments of this application, the first force applying structure 2371 and the second force applying structure 2372 have simple structures and relatively low costs, and are easy to implement.

The supporting apparatus 20 provided in the embodiments of this application includes the rotating mechanism 23 described in any one of the foregoing embodiments. Therefore, the supporting apparatus 20 and the rotating mechanism 23 can resolve a same technical problem and achieve same effects.

The electronic device 100 provided in the embodiments of this application includes the supporting apparatus 20 described in any one of the foregoing embodiments. Therefore, the electronic device 100 and the supporting apparatus 20 can resolve a same technical problem and achieve same effects.

In the descriptions in this specification, specific features, structures, materials, or characteristics may be combined in a suitable manner in any one or more embodiments or examples.

Finally, it should be noted that, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of this application.

What is claimed is:

1. A rotating mechanism, comprising a base, a first connecting piece, a second connecting piece, a lifting plate, a force applying structure, and a supporting structure; wherein
   both the first connecting piece and the second connecting piece are rotatably connected to the base; the lifting plate is located between the first connecting piece and the second connecting piece; the lifting plate is provided with a fitting surface, and the fitting surface is used for fitting a part of a flexible display; and the lifting plate is provided with a lifting space, the force applying structure is located on at least one side in a circumference of the lifting space, and the force applying structure is connected to the lifting plate; and
   the first connecting piece and the second connecting piece can rotate between an unfolding position and a folding position relative to the base; and when the first connecting piece and the second connecting piece are in the unfolding position, the force applying structure applies, to the lifting plate, a tensile force from the lifting plate to a side of the lifting plate away from the fitting surface, the lifting plate is supported on the supporting structure, and the supporting structure applies, to the lifting plate, a first supporting force that counterbalances the tensile force.

2. The rotating mechanism according to claim 1, wherein when the first connecting piece and the second connecting piece rotate from the unfolding position to the folding position, the supporting structure moves away from the fitting surface to withdraw the first supporting force, and the lifting plate moves down under an action of the tensile force from the force applying structure; and
   when the first connecting piece and the second connecting piece rotate from the folding position to the unfolding position, the supporting structure moves towards the fitting surface to apply a second supporting force to the lifting plate, wherein the second supporting force can overcome the tensile force from the force applying structure to push the lifting plate to move up.

3. The rotating mechanism according to claim 1, wherein the force applying structure comprises a first force applying structure and a second force applying structure, and the first force applying structure and the second force applying structure are located on two opposite sides in the circumference of the lifting space; and
   when the first connecting piece and the second connecting piece are in the unfolding position, the first force applying structure and the second force applying structure each apply, to the lifting plate, a tensile force from the lifting plate to a side of the lifting plate away from the fitting surface.

4. The rotating mechanism according to claim 3, wherein the first connecting piece is rotatably connected to the base by using a first rotating shaft, the second connecting piece is rotatably connected to the base by using a second rotating shaft, the first force applying structure is a first torsion spring, and the second force applying structure is a second torsion spring;
   the first torsion spring comprises a first spiral body and a first torsion arm, wherein the first spiral body is sleeved on the first rotating shaft, one end of the first spiral body is fastened relative to the base, one end of the first torsion arm is fastened to the other end of the first spiral body, and the other end of the first torsion arm is fastened to the lifting plate;
   the second torsion spring comprises a second spiral body and a second torsion arm, wherein the second spiral body is sleeved on the second rotating shaft, one end of the second spiral body is fastened relative to the base, one end of the second torsion arm is fastened to the other end of the second spiral body, and the other end of the second torsion arm is fastened to the lifting plate; and
   when the first connecting piece and the second connecting piece are in the unfolding position, the first torsion arm and the second torsion arm are in a deformed state of swinging towards the fitting surface, so as to apply, to the lifting plate, an elastic tensile force from the lifting plate to a side of the lifting plate away from the fitting surface.

5. The rotating mechanism according to claim 4, wherein when the first connecting piece and the second connecting piece are in the unfolding position, swing-deformation angles of the first torsion arm and the second torsion arm towards the fitting surface are greater than 0° and equal to or less than 85°.

6. The rotating mechanism according to claim 4, wherein the other end of the first torsion arm is slidably connected to the lifting plate in a first direction, wherein the first direction is parallel with the lifting plate and perpendicular to the first rotating shaft; and
   the other end of the second torsion arm is slidably connected to the lifting plate in the first direction.

7. The rotating mechanism according to claim 6, wherein a mounting part is provided on the first torsion arm;
   a hook is provided on a surface of the lifting plate away from the fitting surface, and the hook is provided with a guiding section that extends in the first direction; and the first torsion arm is mounted to the hook by using the mounting part, and can slide along the guiding section.

8. The rotating mechanism according to claim 7, wherein the first spiral body comprises a first spiral part and a second spiral part, both the first spiral part and the second spiral part are sleeved on the first rotating shaft, and the first spiral part and the second spiral part are separated from each other in a length direction of the first rotating shaft;
   one end of the first spiral part close to the second spiral part is a first end of the first spiral part, and one end of the second spiral part close to the first spiral part is a first end of the second spiral part; and
   the first torsion arm is n-shaped, two ends of the first torsion arm are respectively fastened to the first end of first spiral part and the first end of the second spiral part, and a middle bent part of the first torsion arm forms the mounting part.

9. The rotating mechanism according to claim 8, wherein one end of the first spiral part away from the second spiral part is a second end of the first spiral part, and one end of the second spiral part away from the first spiral part is a second end of the second spiral part; and
   the first spiral body is fastened to the base by using the second end of the first spiral part and the second end of the second spiral part.

10. The rotating mechanism according to claim 3, wherein the first force applying structure is a first spring piece, and the second force applying structure is a second spring piece;
    one end of the first spring piece and one end of the second spring piece are fastened relative to the base, and the other end of the first spring piece and the other end of the second spring piece are connected to the lifting plate; and
    when the first connecting piece and the second connecting piece are in the unfolding position, the first spring piece and the second spring piece are in a deformed state of bending towards the fitting surface, so as to apply, to the lifting plate, an elastic tensile force from the lifting plate to a side of the lifting plate away from the fitting surface.

11. The rotating mechanism according to claim 3, wherein the first force applying structure is a first spiral telescopic spring, and the second force applying structure is a second spiral telescopic spring;
    one end of the first spiral telescopic spring and one end of the second spiral telescopic spring in their stretching directions are connected to the base, and the other end of the first spiral telescopic spring and the other end of the second spiral telescopic spring in their stretching directions are connected to the lifting plate; and
    when the first connecting piece and the second connecting piece are in the unfolding position, the first spiral telescopic spring and the second spiral telescopic spring are in an elongated and deformed state to apply, to the lifting plate, an elastic tension force from the lifting plate to a side of the lifting plate away from the fitting surface.

12. The rotating mechanism according to claim 3, wherein the first force applying structure comprises a first magnet and a first magnetic sheet, and the second force applying structure comprises a second magnet and a second magnetic sheet;
    one of the first magnet and the first magnetic sheet is fastened relative to the base, and the other of the first magnet and the first magnetic sheet is fastened relative to the lifting plate;
    one of the second magnet and the second magnetic sheet is fastened relative to the base, and the other of the second magnet and the second magnetic sheet is fastened relative to the lifting plate; and
    when the first connecting piece and the second connecting piece are in the unfolding position, the first magnet and the first magnetic sheet are separated from each other and there is a magnetic attraction therebetween, and the second magnet and the second magnetic sheet are separated from each other and there is a magnetic attraction therebetween to apply, to the lifting plate, a magnetic attraction force from the lifting plate to a side of the lifting plate away from the fitting surface.

13. The rotating mechanism according to claim 1, wherein the supporting structure comprises a first supporting and a second supporting arm, the first supporting is fastened relative to the first connecting piece, and the second supporting arm is fastened relative to the second connecting piece; and
    when the first connecting piece and the second connecting piece rotate from the unfolding position to the folding position, the first supporting and the second supporting arm are driven to rotate away from the fitting surface to withdraw the first supporting force; and when the first connecting piece and the second connecting piece rotate from the folding position to the unfolding position, the first supporting arm and the second supporting arm are driven to rotate towards the fitting surface to apply the second supporting force to the lifting plate.

14. The rotating mechanism according to claim 13, wherein the first connecting piece is fastened to the first rotating shaft, and the first rotating shaft is rotatably connected to the base with itself as an axis;
    the second connecting piece is fastened to the second rotating shaft, and the second rotating shaft is rotatably connected to the base with itself as an axis; and
    the first supporting is fastened to the first rotating shaft, and the second supporting arm is fastened to the second rotating shaft.

15. The rotating mechanism according to claim 14, wherein a first flat position is provided on a side surface of the first rotating shaft, a flat hole is provided in the first supporting, and the first supporting arm is sleeved on the first rotating shaft through the flat hole in a coordinated manner.

16. The rotating mechanism according to claim 14, wherein a first gear is fastened to the first rotating shaft, and a central axis of the first gear coincides with a central axis of the first rotating shaft;
    a second gear is fastened to the second rotating shaft, and a central axis of the second gear coincides with a central axis of the second rotating shaft; and
    the first gear and the second gear have a same diameter, and the first gear and the second gear are meshed for driving; or an even number of intermediate gears are provided between the first gear and the second gear, and the first gear, the even number of intermediate gears, and the second gear are sequentially meshed for driving.

17. A supporting apparatus, comprising a first housing, a second housing, and the rotating mechanism according to claim 1, wherein the rotating mechanism is located between the first housing and the second housing, the first connecting piece of the rotating mechanism is connected to the first housing, and the second connecting piece of the rotating mechanism is connected to the second housing.

18. An electronic device, comprising a flexible display and the supporting apparatus according to claim 17; wherein the flexible display comprises a first part, a second part, and a third part, wherein the third part is located between the first part and the second part, the first part is supported by and fastened to the first housing, the second part is supported by and fastened to the second housing, when the first connecting piece and the second connecting piece are in the unfolding position, the third part is supported by and fastened to the rotating mechanism of the supporting apparatus.

* * * * *